US009692268B2

United States Patent
Liu et al.

(10) Patent No.: US 9,692,268 B2
(45) Date of Patent: Jun. 27, 2017

(54) CONDUCTIVE WIRE UNIT AND GENERATOR WITH CLOSED MAGNETIC PATH

(71) Applicant: Gang Liu, Henan (CN)

(72) Inventors: Gang Liu, Henan (CN); Ziyi Liu, Henan (CN)

(73) Assignee: Gang Liu, Henan (CN)

( * ) Notice: Subject to any disclaimer, the term of this patent is extended or adjusted under 35 U.S.C. 154(b) by 418 days.

(21) Appl. No.: 14/328,611

(22) Filed: Jul. 10, 2014

(65) Prior Publication Data

US 2014/0346917 A1 Nov. 27, 2014

Related U.S. Application Data

(60) Division of application No. 13/236,548, filed on Sep. 19, 2011, now Pat. No. 8,810,103, which is a
(Continued)

(30) Foreign Application Priority Data

Aug. 14, 2007 (CN) .......................... 2007 1 0054952
Oct. 30, 2007 (CN) .......................... 2007 1 0189872

(51) Int. Cl.
*H02K 3/04* (2006.01)
*H02K 21/14* (2006.01)
(Continued)

(52) U.S. Cl.
CPC ................. *H02K 3/04* (2013.01); *H02K 1/12* (2013.01); *H02K 3/524* (2013.01); *H02K 21/14* (2013.01);
(Continued)

(58) Field of Classification Search
CPC ........ H02K 16/00; H02K 16/02; H02K 16/04; H02K 1/2793; H02K 3/28; H02K 3/32
(Continued)

(56) References Cited

U.S. PATENT DOCUMENTS 3,648,086 A  3/1972  Renner et al. .................. 310/63
5,977,684 A  11/1999  Lin .............................. 310/268
(Continued)

FOREIGN PATENT DOCUMENTS

CN     2126942 Y    2/1993
CN     1193216 A    9/1998
(Continued)

OTHER PUBLICATIONS

International Search Report of corresponding International PCT Application No. PCT/CN2008/071983, dated Nov. 27, 2008.
(Continued)

*Primary Examiner* — Thanh Lam
(74) *Attorney, Agent, or Firm* — J.C. Patents

(57) ABSTRACT

A stator for a generator, comprises a coil support frame and a conductive wire unit arranged on the coil support frame, wherein the conductive wire unit comprises one basic conductive wire unit or a plurality of stacked basic conductive wire units, the basic conductive wire unit comprises a conductive wire layer and a magnetic-conducting sheet conformably stacked on and insulated from the conductive wire layer. A generator with closed-magnetic-path comprises a rotor and a stator, wherein the stator comprises the above conductive wire unit having a magnetic-conducting base plate, wherein the stator further comprises a magnetic yoke, the rotor comprises a transmission shaft, the conductive wire unit is fixedly connected in the magnetic yoke, at least a magnetic-conducting plate is coaxially connected on the transmission shaft, a magnet is connected on the magnetic-
(Continued)

conducting plate, of which a magnetic pole is arranged towards the conductive wire unit.

14 Claims, 24 Drawing Sheets

Related U.S. Application Data continuation of application No. 12/704,424, filed on Feb. 11, 2010, now abandoned, which is a continuation of application No. PCT/CN2008/071983, filed on Aug. 14, 2008.

(51) Int. Cl.
    *H02K 21/24*    (2006.01)
    *H02K 3/52*     (2006.01)
    *H02K 1/12*     (2006.01)
    *H02K 7/18*     (2006.01)
    *H02K 1/00*     (2006.01)

(52) U.S. Cl.
    CPC .............. *H02K 21/24* (2013.01); *H02K 1/00* (2013.01); *H02K 7/1807* (2013.01)

(58) Field of Classification Search
    USPC ................ 310/112–114, 266, 268, 208, 194
    See application file for complete search history.

(56) References Cited

U.S. PATENT DOCUMENTS

| | | | |
|---|---|---|---|
| 7,659,642 B2* | 2/2010 | Jeong | F04B 35/045 310/15 |
| 7,696,664 B2* | 4/2010 | Liu | H02K 1/14 310/216.106 |
| 8,810,103 B2* | 8/2014 | Liu | H02K 21/14 310/194 |

FOREIGN PATENT DOCUMENTS

| | | |
|---|---|---|
| CN | 1213885 A | 4/1999 |
| CN | 1393974 A | 1/2003 |
| CN | 1421983 A | 6/2003 |
| GB | 2 112 417 A | 7/1983 |
| JP | 62-160047 A | 7/1987 |
| JP | 11-341786 A | 12/1999 |
| JP | 2004-147372 A | 5/2004 |
| JP | 2005-185041 A | 7/2005 |

OTHER PUBLICATIONS

European Examination Report of corresponding European Application No. 08 783 974.3, dated Jun. 20, 2011.
The extended European Search Report of corresponding International PCT Application No. PCT/CN2008/071983, dated Aug. 3, 2010.
Canada Examination Report of corresponding Canadian Application No. 2,696,278, dated May 9, 2012.
Canada Examination Report of corresponding Canadian Application No. 2,696,278, dated Apr. 1, 2014.
Japanese Examination Report of corresponding Japan Application No. 2010-520408, dated Mar. 23, 2012.
Korean Examination Report of corresponding Korean Application No. 10-2010-7005448, dated May 13, 2011.
Philippines Examination Report of corresponding Philippines Application No. 12010500349, dated Sep. 7, 2012.
Vietnam Examination Report of corresponding Vietnam Application No. 1-2010-00520, dated Jul. 8, 2013.
Australian Examination Report of corresponding Australian Application No. 2008286516, dated Sep. 29, 2011.

* cited by examiner

CONDUCTIVE WIRE UNIT AND GENERATOR WITH CLOSED MAGNETIC PATH

CROSS-REFERENCE TO RELATED APPLICATIONS

This application is a divisional application of U.S. application Ser. No. 13/236,548, filed on Sep. 19, 2011, which is a continuation-in-part of U.S. application Ser. No. 12/704,424, filed on Feb. 11, 2010, which is a continuation of international Application No. PCT/CN2008/071983, filed on Aug. 14, 2008, which in turn claims the priority benefits of Chinese Patent Application No. 200710054952.1, filed on Aug. 14, 2007 and Chinese Patent Application No. 200710189872.7, filed on Oct. 30, 2007. The contents of the above identified applications are incorporated herein by reference in their entireties.

FIELD OF THE TECHNOLOGY

The present invention relates to the electrical field, and more particularly to the conductive wire unit and the DC generator with closed-magnetic-path coils.

BACKGROUND

Currently, in most of well-known generators, a prime motor drives a rotor to rotate, so as to cause magnetic induction at a coil to generate a current. However, a magnetic field induced by the coil tends to impede the rotation of the rotor. The electric energy obtained by this method is quite undesirable. Therefore, it is quite urgent for people to solve the problem of raising power converting efficiency of the generator. A patent application with a publication number of CN1393974 provides a "Generator Excited by Both Electromagnet and Permanent Magnet" which solves a problem of voltage adjustment in a permanent magnet generator. A patent application with a publication number of CN1421983 provides a "Great-capacity Single-phase Brushless Synchronous Generator" which solves a problem that the single-phase generator develops towards a great capacity. However, in the above technical solutions, the acting force of the magnetic field still exists when the conductive wire unit and the rotor of the generator are working, and the work of the rotor still needs to overcome the acting force of the magnetic field. Therefore, the problem of low power-conversion efficiency of the generator is not solved in the prior art.

SUMMARY

One aspect of the invention provides a stator for a generator with closed magnetic path, which comprises a coil support frame and a conductive wire unit arranged on the coil support frame, wherein the conductive wire unit comprises one basic conductive wire unit or a plurality of stacked basic conductive wire units, the basic conductive wire unit comprises a conductive wire layer and a magnetic-conducting sheet conformably stacked on and insulated from the conductive wire layer.

Preferably, the conductive wire layer comprises a plurality of conductive wires arranged in parallel and insulated from each other. Preferably, the plurality of conductive wires are divided into a plurality of groups, the conductive wires in each group are electrically connected in parallel, and the plurality of groups are electrically connected to each other in series.

Preferably, the conductive wire unit further comprises a shaped magnetic-conducting basic plate on which one basic conductive wire unit or plurality of stacked basic conductive wire units are conformably formed, wherein the basic conductive wire unit further comprises a first insulation layer formed on one side of the conductive wire layer and positioned between the conductive wire layer and the magnetic-conducting sheet, a second insulation layer formed on the other side of the conductive wire layer.

In an embodiment, the conductive wire layer is formed by a single continuous conductive wire or bound multiple continuous conductive wires wound as a coil around a shaped magnetic-conducting base plate.

In an embodiment, the conductive wire layer comprises a conductive sheet with a plurality of elongated through gaps extending from a central region of the conductive sheet to a circumferential region of the conductive sheet, elongated portions between the elongated gaps function as conductive wires connected in parallel between the central region and the circumferential region. Preferably, a plurality of elongated through gaps are formed on the magnetic-conducting sheet, the elongated through gaps extend from a central region of the magnetic-conducting sheet to a circumferential region of the magnetic-conducting sheet.

Another aspect of the invention provides a generator with closed-magnetic-path comprising a rotor and a stator, wherein the stator comprises a conductive wire unit according to the invention as defined in the claims.

BRIEF DESCRIPTION OF THE DRAWINGS

In order that the embodiments of the invention or the technical solutions in the prior art are specified more clearly, the embodiments and the drawings needed and used in the prior art are simply introduced in the followings. It is apparent that the drawings described in the followings are a plurality of embodiments of the invention. The ordinary persons skilled in the art can obtain other drawings according to these drawings under the premise that they do not offer creative work.

DETAILED DESCRIPTION

In order to make the purposes, technical solutions and advantages of embodiments of the invention clearer, the technical solutions of the embodiments of the invention are described more clearly and more completely in combination with the drawings of the embodiments of the invention. It is obvious that the described embodiments are only part of embodiments of the invention and not all of the embodiments thereof. Based on the embodiments of the invention, the other embodiments or modifications obtained by persons skilled in the art without creative work are all within the scope protected by the claimed invention. The following embodiments can be referenced with each other. The embodiments are only used for illustrations.

The term "and/or" as used herein is only the association relationship of described association objectives, it can have three relationships. For example, "A and/or B" can mean that: A exists separately; A and B exist at the same time, and B exists separately.

Figure 1:
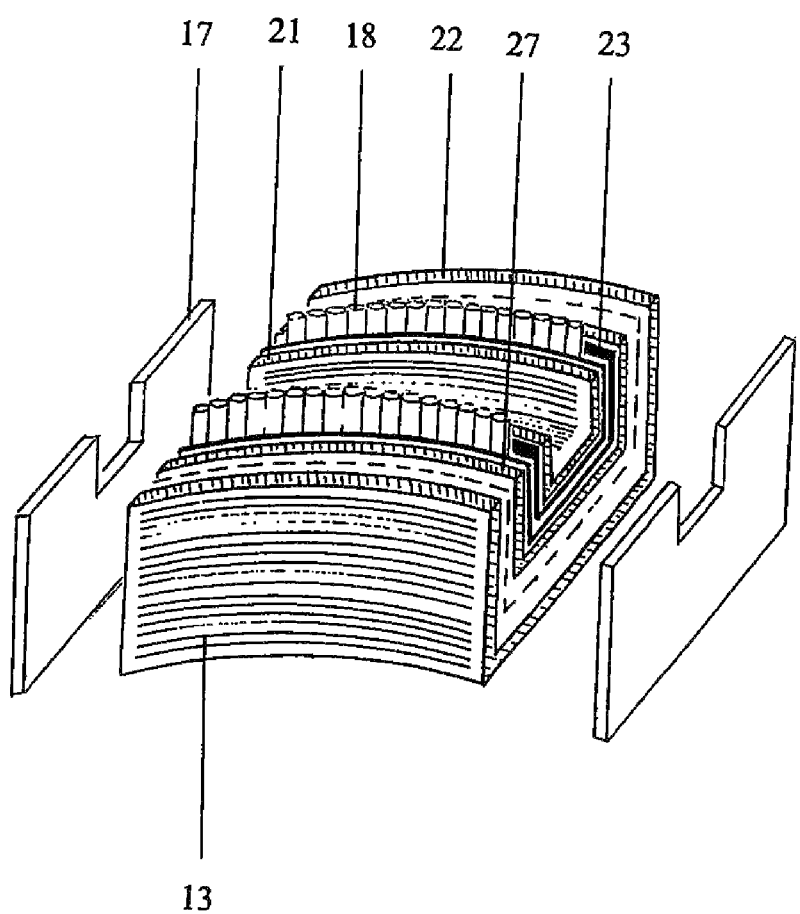
FIG. 1 is a structure drawing of a conductive wire unit provided in one embodiment of the invention.
Figure 24:
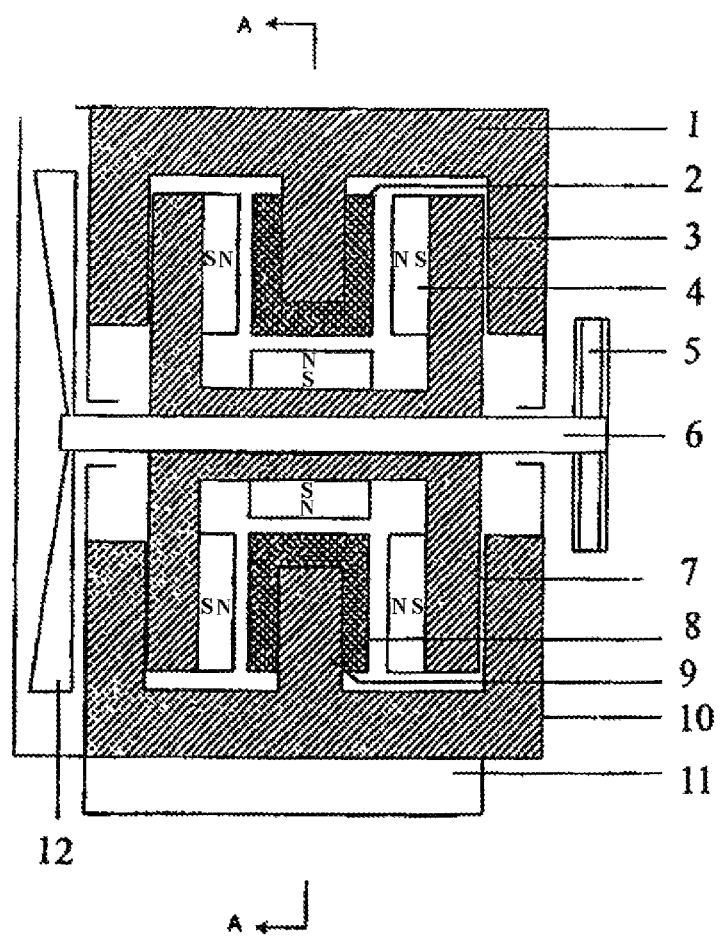
FIG. 24 is a structure drawing of four kinds of generators provided in an embodiment of the invention.
Figure 25:
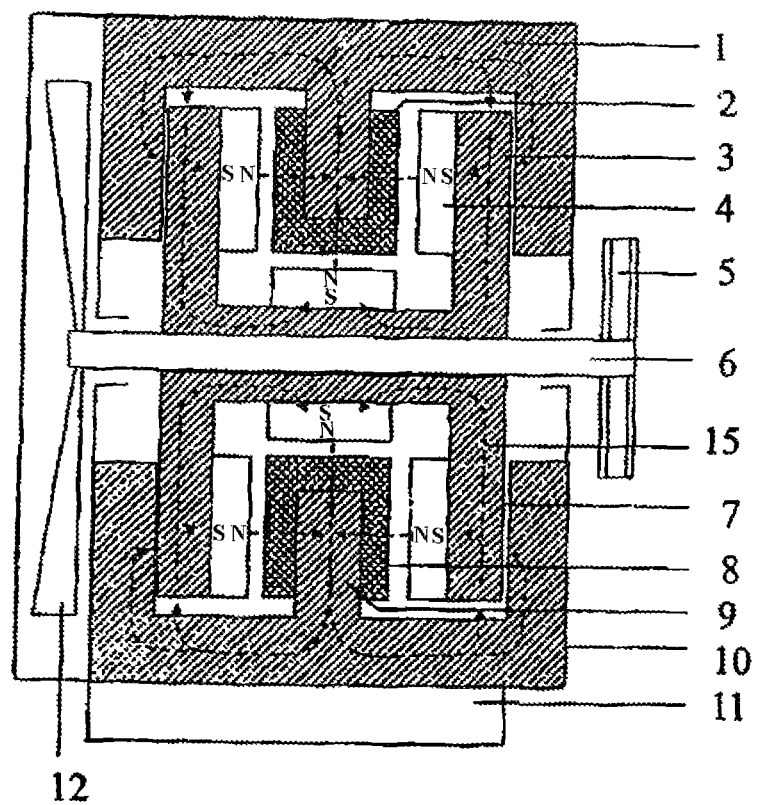
FIG. 25 is a drawing of magnetic force line of a rotor of a generator provided in FIG. 24.
Figure 28:
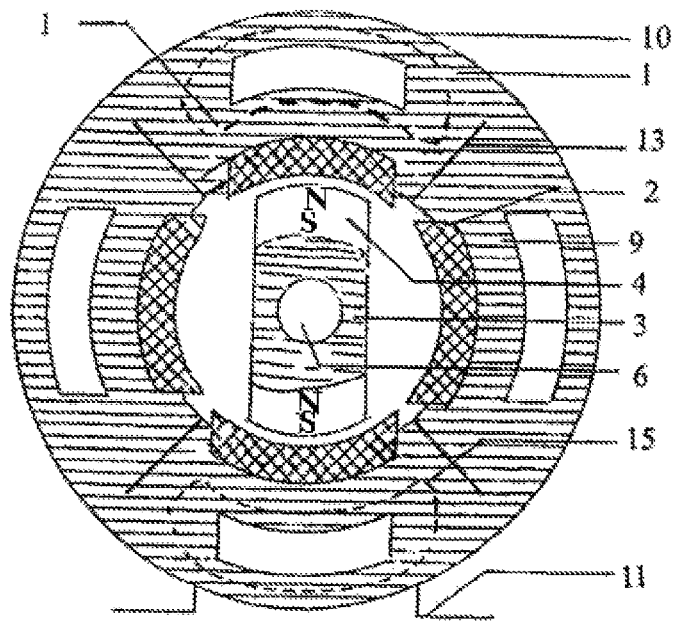
FIG. 28 is a drawing of a magnetic force line of a conductive wire unit of a generator provided in FIG. 24.
Figure 29:
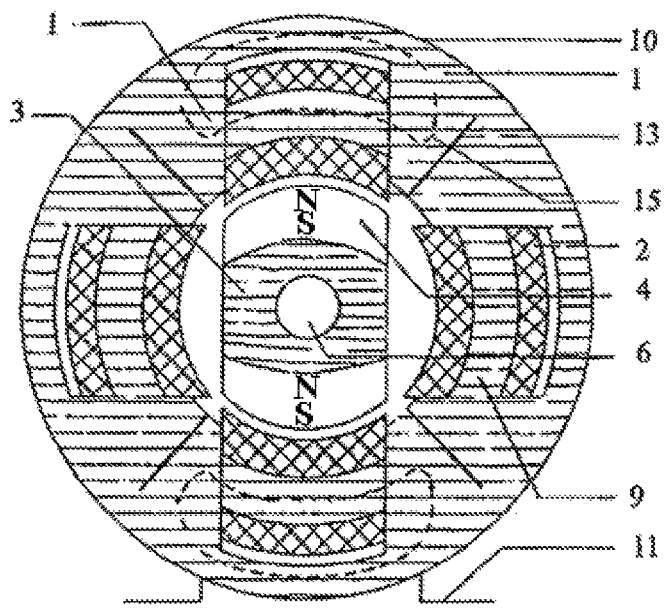
FIG. 29 is a drawing of a magnetic force line of a conductive wire unit of a generator provided in FIG. 24.

FIG. 1 shows the structure of a conductive wire unit provided in one embodiment of the invention. The conductive wire unit can be mounted on a coil support frame of the magnetic yoke in a generator with closed-magnetic-paths. As shown in FIG. 1, the conductive wire unit comprises a U-shaped magnetic-conducting base plate 21, and a plurality of U-shaped basic unit conformably stacked on the outer surface of magnetic-conducting base plate 21 and on each other (Only one U-shaped basic unit is shown in FIG. 1, other U-shaped basic units are represented by the broken line in FIG. 1). U-shaped magnetic-conducting base plate 21 has a bottom wall and two sidewalls extending upward from the bottom wall. The bottom wall and the two sidewalls define a space for receiving the coil support frame of the stator, the bottom wall has an arc shape along its longitudinal axis corresponding to the arc-shaped outer surface of the coil support frame 9 of stator 8 as shown in FIGS. 24 and 25. The upper edges of the two sidewalls have an arc shape corresponding to that of the bottom wall. The arc shape of the bottom wall also corresponds to the arc shape of the outer surface of a rotor in a generator as shown in FIGS. 28 and 29. U-shaped magnetic-conducting base plate 21 has a U-shaped cross section. It should be understood that U-shaped magnetic-conducting base plate 21 may be made other shapes depending on the shape of the coil support frame and the rotor as known in the art. In the embodiment shown in FIG. 1, the U-shaped basic units are conformably formed along substantially the entire outer surface of U-shaped magnetic-conducting base plate 21. Each U-shaped basic unit comprises a conductive wire layer consisting of a plurality of conductive wires 18 insulated from each other and arranged in a layer in parallel, which are also substantially perpendicular to the longitudinal axis of U-shaped magnetic-conducting base plate 21 in the embodiment shown in FIG. 1, a U-shaped magnetic-conducting sheet 27 with a shape and structure similar to that of U-shaped magnetic-conducting base plate 21 conformably formed on and insulated from conductive wire layer, and an optional first insulation layer 23 formed between conductive wire layer and the U-shaped magnetic-conducting sheet 27 to further insulate the two. In this embodiment, conductive wires 18 are individual separate wires, each with two ends extending upward as shown in FIG. 1. An optional second insulation layer 23 can be formed on the other side of conductive wire layer so that conductive wire layer is sandwiched between the two insulation layers 23. A shield sheet 17 with an opening corresponding to the U-shaped cross section of magnetic-conducting base plate 21 is provided at two ends of magnetic-conducting base plate 21, respectively, to cover the edges of conductive wire layer and magnetic-conducting sheet 27. Shield sheet 17 has a low magnetic conductivity lower than that of magnetic-conducting sheet 27 and magnetic-conducting base plate 21. An optional magnetic-conducting cover sheet 22 with an U-shaped cross section can be provided to cover the outer surface of the U-shaped basic units so that the plurality of U-shaped basic units are sandwiched between magnetic-conducting base plate 21 and magnetic-conducting cover sheet 22, and the gap formed between magnetic-conducting base plate 21 and magnetic-conducting cover sheet 22 is covered by shield plates 17 at two ends.

It should be understood that, according to the output power and the body size of a generator, the above conductive wire unit may contain only one U-shaped basic unit, or contain more than one U-shaped basic units stacked on each other. There is no specific limitation to the number of U-shaped basic units. For example, depending on the size output voltage of the generator, there can be 5-200, or up to 1000 or 2000 U-shaped basic units stacked on each other in one conductive wire unit. The conductive wire layers in different U-shaped basic units can be electrically connected in series or in parallel, or divided into groups connected in series and within each group the conductive wire layers are connected in parallel.

In the embodiment, magnetic-conducting base plate 21 and magnetic-conducting sheet 27 can be made from any suitable magnetic-conducting iron-containing material known in the art, such as pure iron, silicon iron, RE-Fe alloy.

Indeed, any magnetic-conducting parts described herein can be made from the above magnetic-conducting material.

In the embodiment, conductive wire 18 is coated with a layer of insulation material. The diameter of conductive wire 18 (including the insulation layer) can be in the range of 0.01 mm-1 mm, but not limited to this range. For example, if the coated conductive wire 18 has a diameter of 0.51 mm, the inner metal conductor (such as copper or aluminum wire) may have a diameter of 0.49 mm, and the outer insulation layer may have a thickness of 0.01 mm. The above described conductive wire 18 can be used in all of the following embodiments. The use of conductive wire 18 with proper diameter such as described above can improve power-generating efficiency. The number of individual conductive wires 18 in each conductive wire layer can be determined according to the specific application and there is no specific limitation. For most applications, the number of individual conductive wires 18 in each conductive wire layer does not exceed 20000, for example, it can be in the range of 100-1000 depending on the diameter of conductive wire 18. Individual conductive wires 18 in each conductive wire layer can be electrically connected in different ways at two ends thereof to form an electrical passage. For example, a number of conductive wires 18 in one conductive wire layer can be connected to each other in parallel at two ends thereof as one group. Conductive wires 18 in each conductive wire layer can be divided into a plurality of such groups, and these groups of conductive wires 18 are connected to each other in series to form an electrical passage. Preferably, each of the groups contains the same number of individual conductive wires 18, and the conductor (wire or welding solder) electrically connecting the groups in series has a current-conducting cross sectional area substantially the same as or larger than the total cross sectional area of all individual conductive wires 18 in a group or has a resistance substantially the same as or less than the total resistance of a group of conductive wires, although the invention is not limited to this arrangement. If desirable, the conductor between two groups can be selected from materials with low melting point, for example lower than that of the conductive wire 18, so that before achieving maximum current that conductive wire 18 can stand, the conductor will be melted to cut off the electrical passage. This assures the safety of operation, protects the conductive wire unit and makes it easier to repair the conductive wire unit. Such low melting point material can be a fuse. The electrical connection between conductive wires 18 and between different groups can be done by the following method. First, the insulation layer at two ends of conductive wires 18 is removed to expose a portion of conductive wires at two ends thereof. Removing the insulation layer at two ends of the conductive wires can be achieved by using chemical solvent to dissolve or etch a portion of the insulation layer, or by mechanical method, or the combination of the two. The exposed ends of each predetermined group of conductive wires 18 can be pressed together, or welded, pressed and welded, or heat-pressed to melt, or partially melt the ends of the conductive wires together, or glued together using conductive glue. When the exposed ends of each predetermined group of conductive wires 18 are first pressed together and then welded, residual resistant films existing in the connection area of the conductive wire ends can be avoided so as to improve electrical conductivity.

In a specific embodiment, each conductive wire layer has 160 individual conductive wires 18. The 160 conductive wires 18 are divided into 10 groups, each group contains 10 adjacent conductive wires 18. Therefore, there are total 16 groups. The 10 conductive wires 18 in each group are connected to each other in parallel using the above described press-weld method. The 16 groups of conductive wires are then connected in series at two ends of each groups. Specifically, if the ends of the groups on one side of magnetic-conducting base plate 21 are defined as head-end, and the ends of the groups on the other side of magnetic-conducting base plate 21 are defined as tail-end, the head-end of a group is connected to the tail-end of an adjacent group. If the induced voltage in each of the 16 groups of conductive wires 18 is 1V, each group will have a voltage of 1V, and the voltage generated in a conductive wire layer containing the 16 groups connected in series will be 16V.

Shield sheet 17 is made of low magnetic-conducting material which can be any suitable material known in the art such as bakelite. The purpose of providing shield sheet 17 at two end sides of magnetic-conducting base plate 21 is to prevent the magnetic line of the magnetic body on a rotor leaks out from two end sides of conductive wire unit. Preferably, the thickness of shield sheet 17 is, but not limited to, less than 10 mm.

Preferably, insulation layer 23 is provided between conductive wires 18 and magnetic-conducing base plate 21 and between conductive wires 18 and magnetic-conducting sheet 27, respectively, in order to assure insulation therebetween. Preferably, the thickness of insulation layer 23 is, but not limited to, less than 0.2 mm.

Preferably, at least one elongated through gap 13 is formed on magnetic-conducting base plate 21, magnetic-conducting sheet 27 and magnetic-conducting cover sheet 22. The width of through gap 13 does not exceed 5 mm. Preferably, the direction of the length of the through gap 13 is perpendicular to the axis direction of conductive wires 18, as shown in FIG. 1. Preferable, a plurality of through gaps 13 are formed on two sidewalls and bottom wall of the U-shaped magnetic-conducting base plate 21 and on two sidewalls and bottom wall of the U-shaped magnetic-conducting sheet 27, and also on two sidewalls and bottom wall of the U-shaped magnetic-conducting cover sheet 22 (if any). Through gaps 13 efficiently prevent the turbulent current generated when magnetic-conducting base plate 21 and magnetic-conducting sheet 27 are cut by magnetic lines. For example, in a specific embodiment, 100 equally spaced through gaps 13 are formed on two sidewalls and bottom wall of the U-shaped magnetic-conducting base plate 21, and 120 equally spaced through gaps 13 are formed on two sidewalls and bottom wall of the U-shaped magnetic-conducting sheet 27.

Preferably, the thickness of magnetic-conducting base plate 21 is equal to or greater than that of magnetic-conducting cover sheet 22 and, if magnetic-conducting cover sheet 22 is not used, equal to or greater than that of the outmost magnetic-conducting sheet 27 which functions as the magnetic-conducting cover sheet 22. The thickness of magnetic-conducting cover sheet 22 is equal to or larger than that of the other magnetic-conducting sheets 27. If no magnetic-conducting cover sheet 22 is used, the thickness of the outmost magnetic-conducting sheet 27 which functions as the magnetic-conducting cover sheet 22 can be equal to or larger than that of the other magnetic-conducting sheets 27. Preferably, the thickness of insulation layer 23 is less than that of any magnetic-conducting sheets 27.

Figure 26:
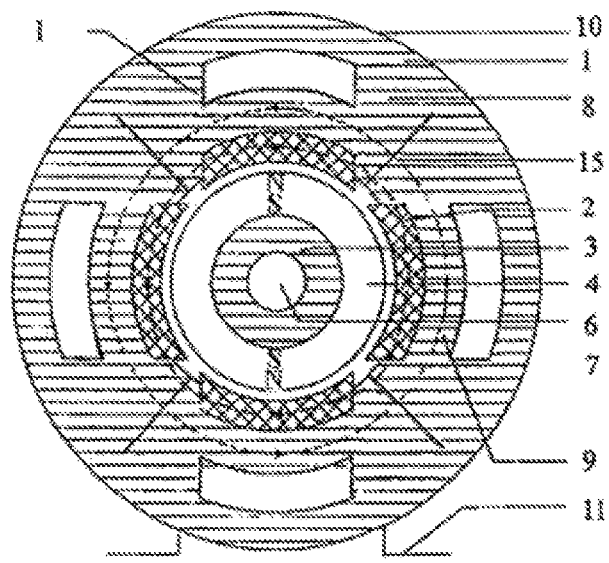
FIG. 26 is a drawing of a magnetic force line of a conductive wire unit of a generator provided in FIG. 24.

Preferably, U-shaped magnetic-conducting sheet 27 has an arc-shaped bottom wall and two sidewalls extending upward from the bottom wall, like U-shaped magnetic-conducting base plate 21. The arc shape of the bottom wall of U-shaped magnetic-conducting sheet 27 corresponds to the arc shape of the end surface of magnetic body 4 of a rotor in a generator as shown in FIGS. 26 and 28. The upper edges of the two sidewalls of U-shaped magnetic-conducting sheet 27 also have an arc shape corresponding to that of the upper edges of U-shaped magnetic-conducting base plate 21.

The conductive wire unit of the embodiment shown in FIG. 1 can be manufactured using the following method. A first square-shaped hollow magnetic-conducting tube with a square cross section (later serves as the U-shaped magnetic-conducting base plate 21) is provided on a square-shaped support base with the support inserted into the hollow space of first square-shaped hollow magnetic-conducting tube, an insulation layer 23 is applied on the outer surface of the square-shaped hollow magnetic-conducting tube; then a single conductive wire 18 or a plurality of conductive wires 18 each coated with an insulation layer or coating are wound on the insulation layer 23 around the outer surface of the square-shaped magnetic-conducting tube, forming a conductive wire layer of conductive wires 18, conductive wires 18 in the conductive wire layer are closely arranged in a single layer with adjacent two conductive wires in direct contact with each other; a second insulation layer 23 is applied onto the layer of conductive wires 18; a second square-shaped hollow magnetic-conducting tube with a square cross section (later serves as an U-shaped magnetic-conducting sheet 27) is provided and the above processed first square-shaped hollow magnetic-conducting tube is inserted into the hollow space of the second square-shaped hollow magnetic-conducting tube, so that the inner sidewalls of the hollow space of the second square-shaped hollow magnetic-conducting tube is in tight fit with the second insulation layer 23; repeating the above steps, i.e., applying an insulation layer 23 on the outer surface of the second square-shaped hollow magnetic-conducting tube, winding conductive wires 18 on the insulation layer 23 around the second square-shaped hollow magnetic-conducting tube to form a layer of closely arranged conductive wires 18, applying anther insulation layer 23 on the layer of conductive wires 18; inserting the above obtained tube into the hollow space of a third square-shaped hollow magnetic-conducting tube with a square cross section (later serves as another U-shaped magnetic-conducting sheet 27). This process can be repeated many times until a predetermined number of conductive wire layers or magnetic-conducting sheets is achieved. Then, the above obtained square tube is cut along its axial direction to form the conductive wire unit as shown in FIG. 1. The conductive wire unit also can be made by the following method. A U-shaped magnetic-conducting base plate with a U-shaped cross section 21 is provided, an insulation layer 23 is applied on the outer surface of the U-shaped magnetic-conducting base plate 21; then a conductive wire layer of individual conductive wires 18 each coated with an insulation layer or coating are formed on the insulation layer 23 around the outer surface of the U-shaped magnetic-conducting base plate 21, conductive wires 18 in the conductive wire layer are closely arranged in a single layer with adjacent two conductive wires in direct contact with each other; a second insulation layer 23 is applied onto the conductive wire layer of conductive wires 18; a U-shaped magnetic-conducting sheet 27 with a U-shaped cross section is placed over the second insulation layer 23, so that the inner sidewalls of the U-shaped magnetic-conducting sheet 27 is in tight fit with the second insulation layer 23 and the conductive wire layer; repeating the above steps, i.e., applying an insulation layer 23 on the outer surface of the U-shaped magnetic-conducting sheet 27, forming another conductive wire layer of conductive wires 18 on the insulation layer 23, applying anther insulation layer 23 on the conductive wire layer of conductive wires 18; placing another U-shaped magnetic-conducting sheet 27 onto the another insulation layer 23. This process can be repeated many times until a predetermined number of conductive wire layers or magnetic-conducting sheets is achieved. It should be understood that the insulation layers 23 can be omitted as long as the insulation requirements between conductive wires 18 and magnetic-conducting sheets 27 are met.

Figure 2:
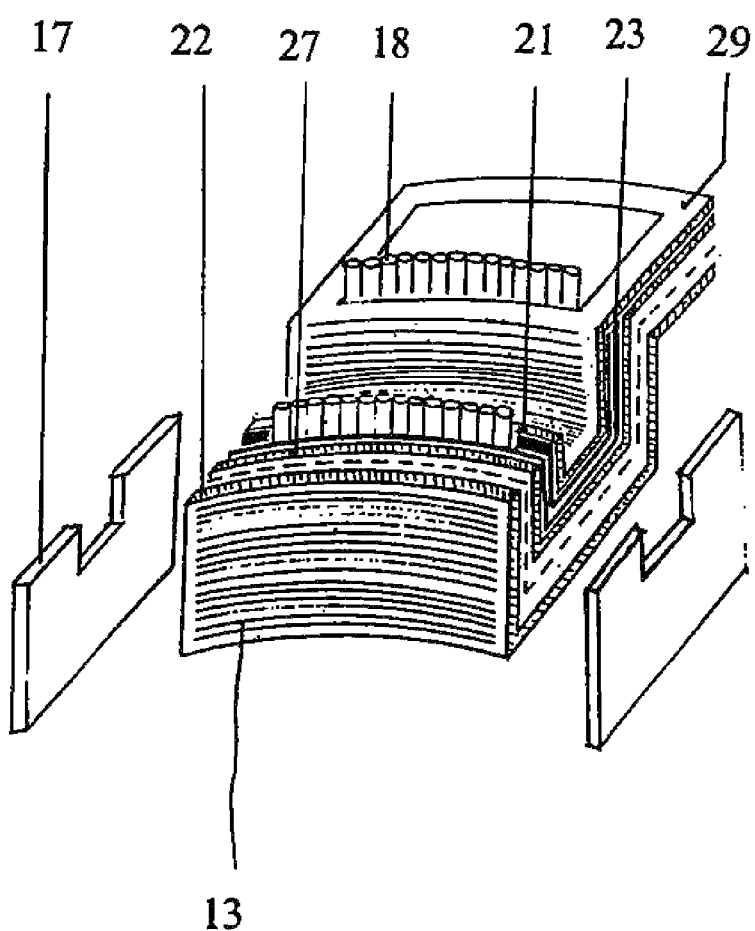
FIG. 2 is a structure drawing of a conductive wire unit provided in another embodiment of the invention.

FIG. 2 is a structure drawing of a conductive wire unit provided in another embodiment of the invention. As shown in FIG. 2, the main difference between the conductive wire unit in the embodiment shown in FIG. 1 and the conductive wire unit of this embodiment lies in the structure of magnetic-conducting base plate 21 and magnetic-conducting sheet 27. In this embodiment, in addition to the structure in the above first embodiment, the magnetic-conducting base plate 21 further comprises extending portion 29 which extends outward from the upper edge of one sidewall in a direction substantially parallel with the arc-shaped bottom wall. An opening is provided in extending portion 29. Magnetic-conducting base plate 21 and its extending portion 29 can be made integrally from the same magnetic-conducting material. In this embodiment, in addition to the structure in the above first embodiment, the magnetic-conducting sheet 27 further comprises extending portion which extends outward from the upper edge of one sidewall in a direction substantially parallel with the arc-shaped bottom wall of magnetic-conducting sheet 27. An opening is provided in extending portion. The magnetic-conducting sheet 27 including its extending portion can be made integrally from the same magnetic-conducting material. When installed, the extending portion of magnetic-conducting sheet 27 is stacked on the extending portion 29 of magnetic-conducting base plate 21, and the opening in the extending portion of magnetic-conducting sheet 27 is aligned with the opening in extending portion 29 of magnetic-conducting base plate 21, and the ends of conductive wire 18 at the corresponding side of magnetic-conducting base plate 21 protrude upward through the aligned openings of extending portions of magnetic-conducting sheet 27 and magnetic-conducting base plate 21 as shown in FIG. 2. There is no specific limit to the shape of the opening as long as the ends of conductive wires 18 in one or more conductive wire layers can protrude through the opening properly. In the embodiment shown in FIG. 2, the opening has a square shape. With the opening, the magnetic field induced by the conductive wires 18 forms a closed magnetic path in the extending portion 29. The optional magnetic-conducting cover sheet 22 can also have an extending portion similar to that of magnetic-conducing base plate 21.

Figure 3:
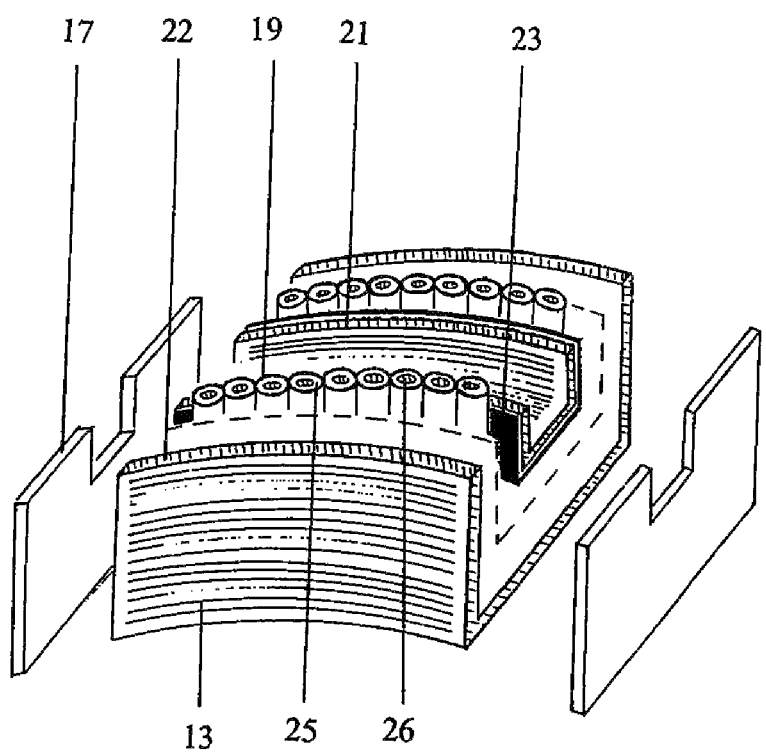
FIG. 3 is a structure drawing of a conductive wire unit provided in another embodiment of the invention.

FIG. 3 is a structure drawing of a conductive wire unit provided in another embodiment of the invention. As shown in FIG. 3, the main difference between the conductive wire unit in the embodiment shown in FIG. 1 and the conductive wire unit of this embodiment lies in that the conductive wires 18 are different, otherwise the conductive wire units in the two embodiments have similar structure. In this embodiment, conductive wire 18 has an iron core. As shown in FIG. 3, conductive wire 18 has an iron core 26, for example, with a circular cross section, iron core 26 is coated with a conductive layer 25 (the conductive layer can be made of metal with good conductivity such as copper, aluminum), conductive layer 25 is coated with an insulation layer 19. Iron core 26 can be can be made of pure iron, silicon iron, RE-Fe alloy, etc. or the mixture thereof.

In some applications, preferably, the thickness of insulation layer 19 does not exceed 0.2 mm, the thickness of conductive layer 25 does not exceed 0.5 mm, and the diameter of iron core 26 is larger than 0.01 mm.

Figure 4:
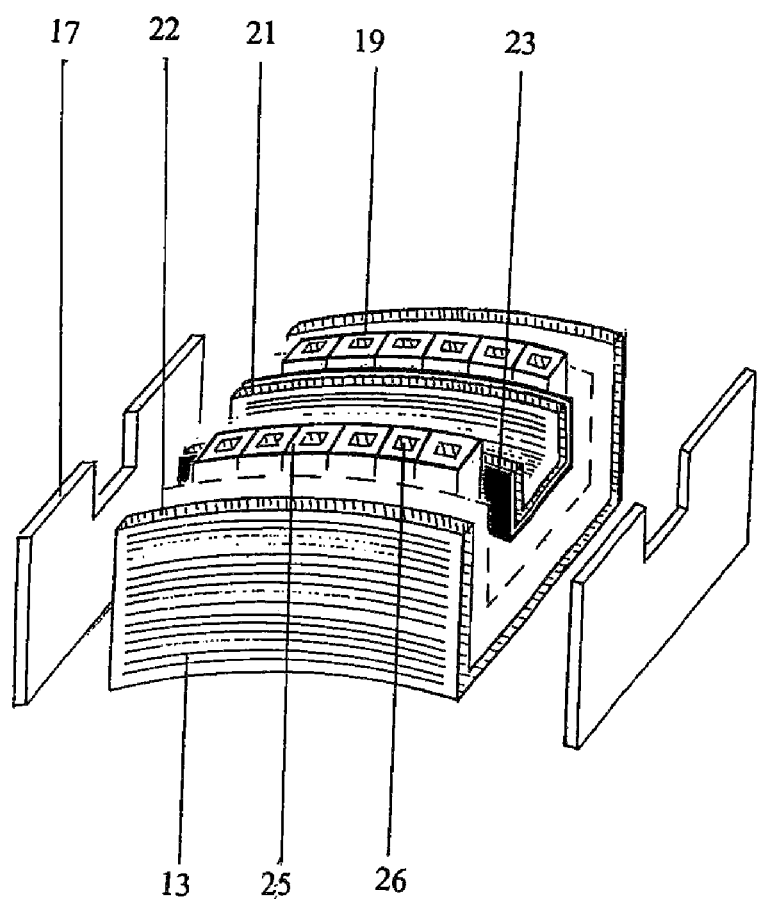
FIG. 4 is a structure drawing of a conductive wire unit provided in another embodiment of the invention.

FIG. 4 is a structure drawing of a conductive wire unit provided in another embodiment of the invention. As shown in FIG. 4, the main difference between the conductive wire unit in the embodiment shown in FIG. 1 and the conductive wire unit of this embodiment lies in that the conductive wires 18 are different, otherwise the conductive wire units in the two embodiments have similar structure. In this embodiment, conductive wire 18 has an iron core. As shown in FIG. 4, conductive wire 18 has an iron core 26, for example, with a square cross section, iron core 26 is coated with a conductive layer 25 (the conductive layer can be made of metal with good conductivity such as copper, aluminum), conductive layer 25 is coated with an insulation layer 19. In some applications, preferably, the thickness of insulation layer 19 does not exceed 0.2 mm, the thickness of conductive layer 25 does not exceed 0.5 mm, and the side length of the square cross section of iron core 26 is larger than 0.01 mm.

Figure 5:
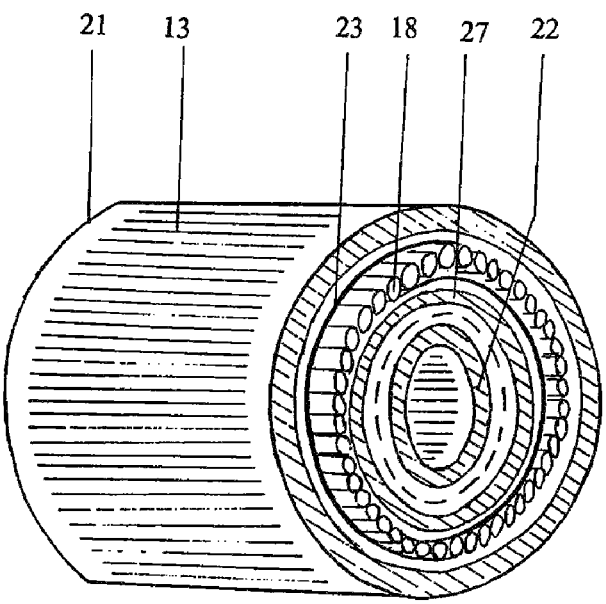
FIG. 5 is a structure drawing of a conductive wire unit provided in one embodiment of the invention.

FIG. 5 is a structure drawing of a conductive wire unit provided in another embodiment in the invention. As shown in FIG. 5, the conductive wire unit in this embodiment comprises a cylindrical magnetic-conducting cover sheet 22 and one or plurality of cylindrical basic units with different diameters. The cylindrical basic units are stacked concentrically on the outer surface of cylindrical magnetic-conducting cover sheet plate 22 (Only one cylindrical basic unit is shown in FIG. 5, other cylindrical basic units which are concentrically placed over cylindrical magnetic-conducting cover sheet 22 are represented by the broken line in FIG. 5). Cylindrical magnetic-conducting cover sheet 22 can be replaced by a cylindrical magnetic-conducting sheet 27. Each of the cylindrical basic units comprises a cylindrical-shaped conductive wire layer consisting of a plurality of conductive wires 18 insulated from each other and arranged in a layer in parallel with each other and extending along the axial direction of the cylindrical-shaped conductive wire layer; a cylindrical magnetic-conducting sheet 27 conformably and concentrically placed over the outer surface of the cylindrical-shaped conductive wire layer and insulated from the cylindrical-shaped conductive wire layer; and an optional first insulation layer 23 formed between the cylindrical-shaped conductive wire layer and the cylindrical magnetic-conducting sheet 27 to further insulate the two. In this embodiment, conductive wires 18 are individual separate wires, each with two ends extending to the two ends of the cylindrical-shaped conductive wire layer as shown in FIG. 5. An optional second insulation layer 23 can be formed on the other side of the cylindrical-shaped conductive wire layer so that cylindrical-shaped conductive wire layer is sandwiched between the two insulation layers 23. A shield sheet 17 with a circular opening in the center corresponding to the circular cross section of the cylindrical magnetic-conducting cover sheet 22 can be provided at two ends of the cylindrical-shaped conductive wire unit, respectively, to cover the two ends of the cylindrical-shaped conductive wire layer and cylindrical magnetic-conducting sheet 27. Conductive wires 18 in each cylindrical-shaped conductive wire layer can be divided into a plurality of groups, conductive wires 18 in each group can be electrically connected in parallel, and different groups can be electrically connected to each other in a similar manner as described above in the embodiment shown in FIG. 1. For example, the electrical connection between conductive wires 18 in one conductive wire layer and between different groups can be done by the following method. First, the insulation layer at two ends of conductive wires 18 is removed to expose a portion of conductive wires at two ends thereof. Removing the insulation layer at two ends of the conductive wires can be achieved by using chemical solvent to dissolve or etch a portion of the insulation layer, or by mechanical method, or the combination of the two. The exposed ends of each predetermined group of conductive wires 18 can be pressed together, or welded, pressed and welded, or heat-pressed to melt, or partially melt the ends of the conductive wires together, or glued together using conductive glue. When the exposed ends of each predetermined group of conductive wires 18 are first pressed together and then welded, residual resistant films existing in the connection area of the conductive wire ends can be avoided so as to improve electrical conductivity.

In a specific embodiment of the structure shown in FIG. 5, each cylindrical-shaped conductive wire layer has 160 individual conductive wires 18. The 160 conductive wires 18 are divided into 10 groups, each group contains 10 adjacent conductive wires 18. Therefore, there are total 16 groups. The 10 conductive wires 18 in each group are connected to each other in parallel using the above described press-weld method. The 16 groups of conductive wires are then connected in series at two ends of each group. Specifically, if the ends of the groups on one end of the cylindrical-shaped conductive wire layer are defined as head-end, and the ends of the groups on the other end of the cylindrical-shaped conductive wire layer 18 are defined as tail-end, the head-end of a group is connected to the tail-end of an adjacent group so that current in all the conductive wires 18 in one conductive wire layer flows in the same direction.

The cylindrical-shaped conductive wire unit of the embodiment shown in FIG. 5 can be manufactured using the following method. A cylindrical magnetic-conducting cover sheet 22 which can replaced with a cylindrical magnetic-conducting sheet 27 is provided on a support, an insulation layer 23 is applied on the outer surface of the cylindrical magnetic-conducting cover sheet 22; then a single conductive wire 18 or a plurality of conductive wires 18 each coated with an insulation layer or coating are wound on the insulation layer 23 around the outer surface of the cylindrical magnetic-conducting cover sheet 22, forming a cylindrical-shaped conductive wire layer of conductive wires 18, in which conductive wires 18 are closely arranged in parallel in a single layer with adjacent two conductive wires in direct contact; a second insulation layer 23 is applied onto the conductive wire layer of conductive wires 18; a cylindrical magnetic-conducting sheet 27 is concentrically and conformably placed over the cylindrical-shaped conductive wire layer, so that the inner surface of the cylindrical magnetic-conducting sheet 27 is in tight fit with the cylindrical-shaped conductive wire layer with the second insulation layer 23 positioned therebetween; repeating the above steps, i.e., applying an insulation layer 23 on the outer surface of the magnetic-conducting sheet 27, winding conductive wires 18 on the insulation layer 23 around the magnetic-conducting sheet 27 to form another cylindrical-shaped conductive wire layer, applying another insulation layer 23 on the another cylindrical-shaped conductive wire layer; concentrically and conformably placing another cylindrical magnetic-conducting sheet 27 over the another cylindrical-shaped conductive wire layer. This process can be repeated many times until a predetermined number of cylindrical-shaped conductive wire layers and cylindrical magnetic-conducting sheets is achieved. It should be understood that the insulation layers 23 can be omitted as long as the insulation requirements between conductive wires 18 and magnetic-conducting sheets 27 are met.

Conductive wires 18 used in this embodiment can be any of those described in the previous embodiments such as insulation layer coated conductive wires.

In addition, the cylindrical-shaped conductive wire layer in the cylindrical conductive wire unit as shown in FIG. 5 can be formed by one single conductive wire 18 or multiple conductive wires 18 wound around cylindrical magnetic-conducting cover sheet 22 or cylindrical magnetic-conducting sheet 27, for example, conductive wire 18 can be wound in a direction substantially perpendicular to the axis of cylindrical magnetic-conducting cover sheet 22.

Preferably, at least one and preferably a plurality of elongated through gaps 13 are provided on cylindrical magnetic-conducting cover sheet 22 and cylindrical magnetic-conducting sheet 27. Through gap 13 extends along the axis direction of cylindrical magnetic-conducting cover sheet 22 with width not exceeding 5 mm. Through gap 13 can efficiently prevent turbulent current generated when cylindrical magnetic-conducting cover sheet 22 and cylindrical magnetic-conducting sheet 27 are cut by magnetic-conducting lines.

Figure 6:
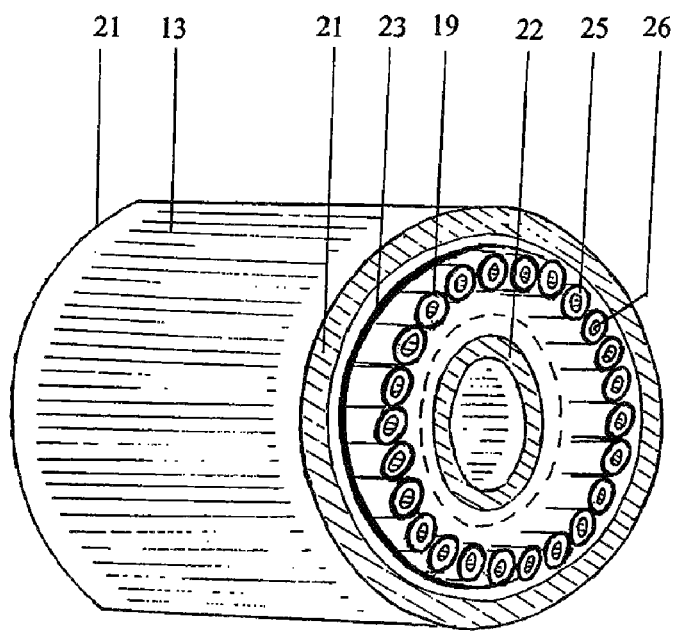
FIG. 6 is a structure drawing of a conductive wire unit provided in another embodiment of the invention.

FIG. 6 is a structure drawing of a conductive wire unit provided in another embodiment of the invention. As shown in FIG. 6, the main difference between the conductive wire unit in the embodiment shown in FIG. 5 and the conductive wire unit of this embodiment lies in that the conductive wires 18 are different, otherwise the conductive wire units in the two embodiments have similar structure. In this embodiment, conductive wire 18 has an iron core. As shown in FIG. 6, conductive wire 18 has an iron core 26, for example, with a circular cross section, iron core 26 is coated with a conductive layer 25 (the conductive layer can be made of metal with good conductivity such as copper, aluminum), conductive layer 25 is coated with an insulation layer 19. Iron core 26 can be made of pure iron, silicon iron, RE-Fe alloy, etc. or the mixture thereof.

In some applications, preferably, the thickness of insulation layer 19 does not exceed 0.2 mm, the thickness of conductive layer 25 does not exceed 0.5 mm, and the diameter of iron core 26 is larger than 0.01 mm.

Figure 7:
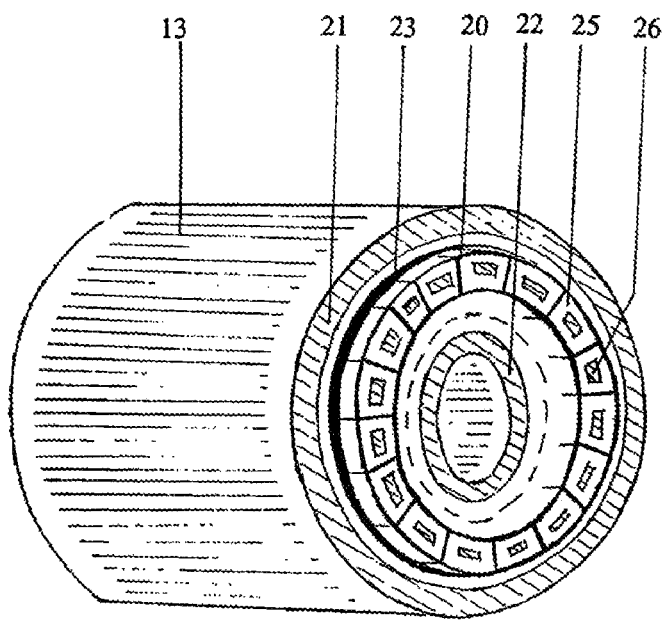
FIG. 7 is a structure drawing of a conductive wire unit provided in another embodiment of the invention.

FIG. 7 is a structure drawing of a conductive wire unit provided in another embodiment of the invention. As shown in FIG. 7, the main difference between the conductive wire unit in the embodiment shown in FIG. 5 and the conductive wire unit of this embodiment lies in that the conductive wires 18 are different, otherwise the conductive wire units in the two embodiments have similar structure. In this embodiment, conductive wire 18 has an iron core. As shown in FIG. 7, conductive wire 18 has an iron core 26, for example, with a square cross section, iron core 26 is coated with a conductive layer 25 (the conductive layer can be made of metal with good conductivity such as copper, aluminum), conductive layer 25 is coated with an insulation layer 20. Iron core 26 can be made of pure iron, silicon iron, RE-Fe alloy, etc. or the mixture thereof.

In some applications, preferably, the thickness of insulation layer 20 does not exceed 0.2 mm, the thickness of conductive layer 25 does not exceed 0.5 mm, and the side length of the square cross section of iron core 26 is larger than 0.01 mm.

Figure 8:
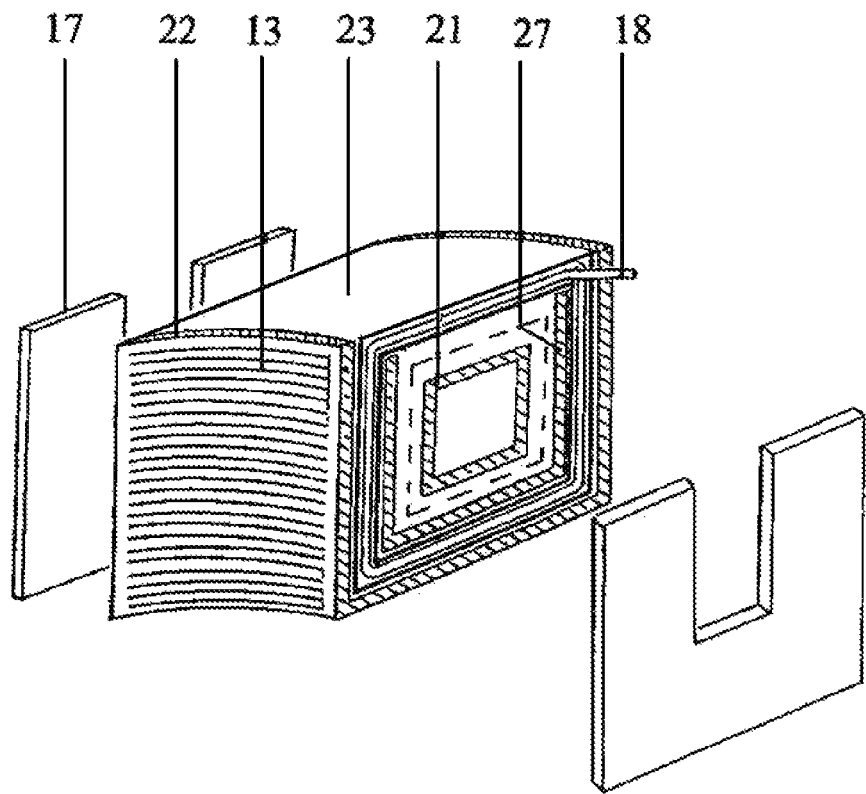
FIG. 8 is a structure drawing of a conductive wire unit provided in one embodiment of the invention.
Figure 27:
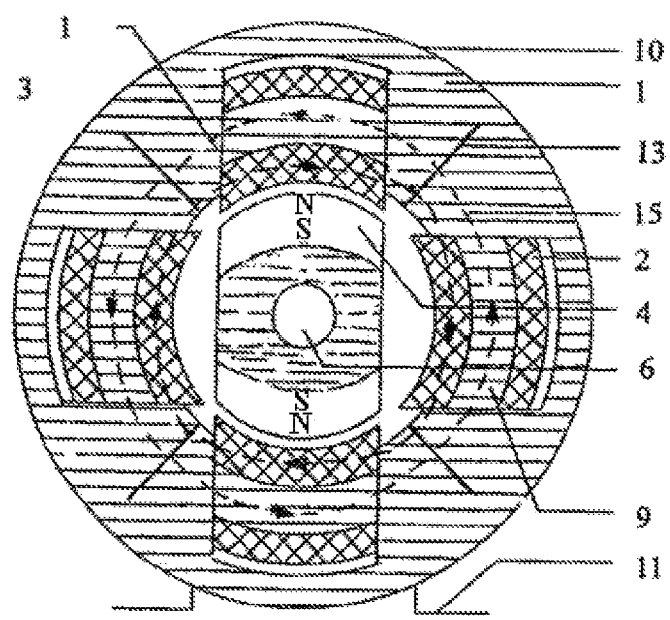
FIG. 27 is a drawing of a magnetic force line of a conductive wire unit of a generator provided in FIG. 24.

FIG. 8 is a structure drawing of a conductive wire unit provided in another embodiment of the invention. As shown in FIG. 8, the conductive wire unit of this embodiment comprises a sleeve magnetic-conducting base plate 21 with four sidewalls defining a space with a square cross section for receiving coil support frame 9 or a portion thereof as shown in FIGS. 27 and 29. The bottom sidewall of sleeve magnetic-conducting base plate 21 is arc-shaped along the axis of the sleeve magnetic-conducting base plate 21 corresponding to the arc-shaped surface of magnetic body 4 as shown in FIGS. 27 and 29. The top sidewall of sleeve magnetic-conducting base plate 21 is similarly arc-shaped. The other two sidewalls extending between the bottom and top sidewalls. Over the outer surface of the sleeve magnetic-conducting base plate 21, one or more square-shaped basic conductive wire unit are conformably formed (In FIG. 8, only one basic conductive wire unit is shown, other basic conductive wire units are represented by broken lines). The basic conductive wire unit comprises a conductive wire layer of conductive wire 18. The conductive wire layer is formed by continuously winding a single conductive wire 18 or multiple conductive wires 18 bound together around the outer surface of sleeve magnetic-conducting base plate 21 to form a coil with the conductive wire 18 extending substantially perpendicular to the axis of the sleeve magnetic-conducting base plate 21. Within the conductive wire layer, the single conductive wire 18 or the bound conductive wires 18 are arranged in parallel and insulated from each other. Within the bound conductive wires 18, each individual conductive wire 18 is insulated from other conductive wires 18. When a single conductive wire 18 is used in the coil, its diameter is larger than that of the conductive wire 18 in the bound conductive wires 18 for the same current capacity. A U-shaped magnetic-conducting sheet 27 with a U-shaped cross section is conformably placed on the conductive wire layer with the top side (the side away from the end surface of magnetic body 4 as shown in FIGS. 27 and 29) exposed by the U-shaped magnetic-conducting sheet 27. Additional conductive wire layers and U-shaped magnetic-conducting sheets 27 can be formed over the first U-shaped magnetic-conducting sheet 27 in a similar way. A U-shaped shield plate 17 made of low magnetic conductivity material is provided at two ends of the sleeve magnetic-conducting base plate 21, respectively, to shield the basic conductive wire units.

Conductive wires 18 used in this embodiment can be any of those described in the previous embodiments such as insulation layer coated conductive wires.

Shield sheet 17 is made of low magnetic-conducting material which can be any suitable material known in the art such as bakelite. The purpose of providing shield sheet 17 at two end sides of sleeve magnetic-conducting base plate 21 is to prevent the magnetic line of the magnetic body 4 on a rotor leaks out from two end sides of conductive wire unit. Preferably, The thickness of shield sheet 17 is, but not limited to, less than 10 mm.

Preferably, insulation layer 23 is provided between conductive wires 18 and sleeve magnetic-conducing base plate 21 and between conductive wires 18 and U-shaped magnetic-conducting sheet 27, respectively, in order to assure insulation therebetween. Preferably, the thickness of insulation layer 23 is, but not limited to, less than 0.2 mm.

Preferably, at least one, preferably multiple, elongated through gap 13 is formed on the sleeve magnetic-conducting base plate 21, the U-shaped magnetic-conducting sheet 27 and magnetic-conducting cover sheet 22 (if any) along the axis direction of the sleeve magnetic-conducting base plate 21. Preferably, the width of through gap 13 does not exceed 5 mm. Preferably, the direction of the length of the through gap 13 is perpendicular to the conductive wires 18. Preferable, a plurality of through gaps 13 are formed on two sidewalls and bottom wall of the sleeve magnetic-conducting base plate 21 and on two sidewalls and bottom wall of the U-shaped magnetic-conducting sheet 27, and also on two sidewalls and bottom wall of a U-shaped magnetic-conducting cover sheet 22 (if any). Through gaps 13 efficiently prevent the turbulent current generated when sleeve magnetic-conducting base plate 21 and U-shaped magnetic-conducting sheet 27 are cut by magnetic lines. For example, in a specific embodiment, 50-200 equally spaced through gaps 13 are formed on each of two sidewalls and bottom wall of the sleeve U-shaped magnetic-conducting base plate 21, and 50-300 equally spaced through gaps 13 are formed on each of two sidewalls and bottom wall of the U-shaped magnetic-conducting sheet 27. The number of through gaps 13 is not limited to this.

Preferably, the thickness of sleeve magnetic-conducting base plate 21 is equal to or greater than that of magnetic-conducting cover sheet 22 and, if magnetic-conducting cover sheet 22 is not used, equal to or greater than that of the outmost U-shaped magnetic-conducting sheet 27 which functions as the magnetic-conducting cover sheet 22. The thickness of magnetic-conducting cover sheet 22 is larger than that of U-shaped magnetic-conducting sheets 27. If no magnetic-conducting cover sheet 22 is used, the thickness of the outmost U-shaped magnetic-conducting sheet 27 which functions as the magnetic-conducting cover sheet 22 can be equal to or larger than that of the other magnetic-conducting sheets 27. Preferably, the thickness of insulation layer 23 is less than that of any magnetic-conducting sheets 27.

Preferably, U-shaped magnetic-conducting sheet 27 has an arc-shaped bottom wall and two sidewalls extending upward from the bottom wall. The arc shape of the bottom wall of U-shaped magnetic-conducting sheet 27 corresponds to the arc shape of the end surface of magnetic body 4 of a rotor in a generator as shown in FIGS. 27 and 29. The upper edges of the two sidewalls of U-shaped magnetic-conducting sheet 27 also have an arc shape.

The sleeve magnetic-conducting base plate 21 may also have other shapes such as circular, rectangular. Accordingly, the magnetic-conducting sheet 27 can also be made of other shapes.

Figure 9:
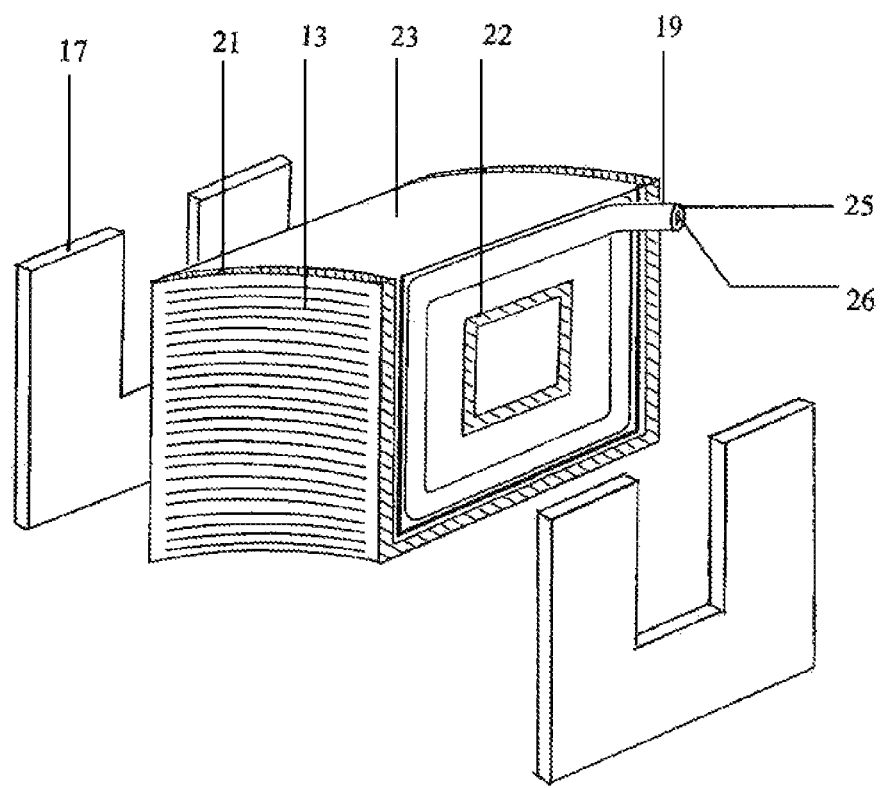
FIG. 9 is a structure drawing of a conductive wire unit provided in another embodiment of the invention.

FIG. 9 is a structure drawing of a conductive wire unit provided in another embodiment of the invention. As shown in FIG. 9, the main difference between the conductive wire unit in the embodiment shown in FIG. 8 and the conductive wire unit of this embodiment lies in that the conductive wires 18 are different, otherwise the conductive wire units in the two embodiments have similar structure. In this embodiment, conductive wire 18 has an iron core. As shown in FIG. 9, conductive wire 18 has an iron core 26, for example, with a circular cross section, iron core 26 is coated with a conductive layer 25 (the conductive layer can be made of metal with good conductivity such as copper, aluminum), conductive layer 25 is coated with an insulation layer 19. Iron core 26 can be made of pure iron, silicon iron, RE-Fe alloy, etc. or the mixture thereof.

In some applications, preferably, the thickness of insulation layer 19 does not exceed 0.2 mm, the thickness of conductive layer 25 does not exceed 0.5 mm, and the diameter of iron core 26 is larger than 0.01 mm.

Figure 10:
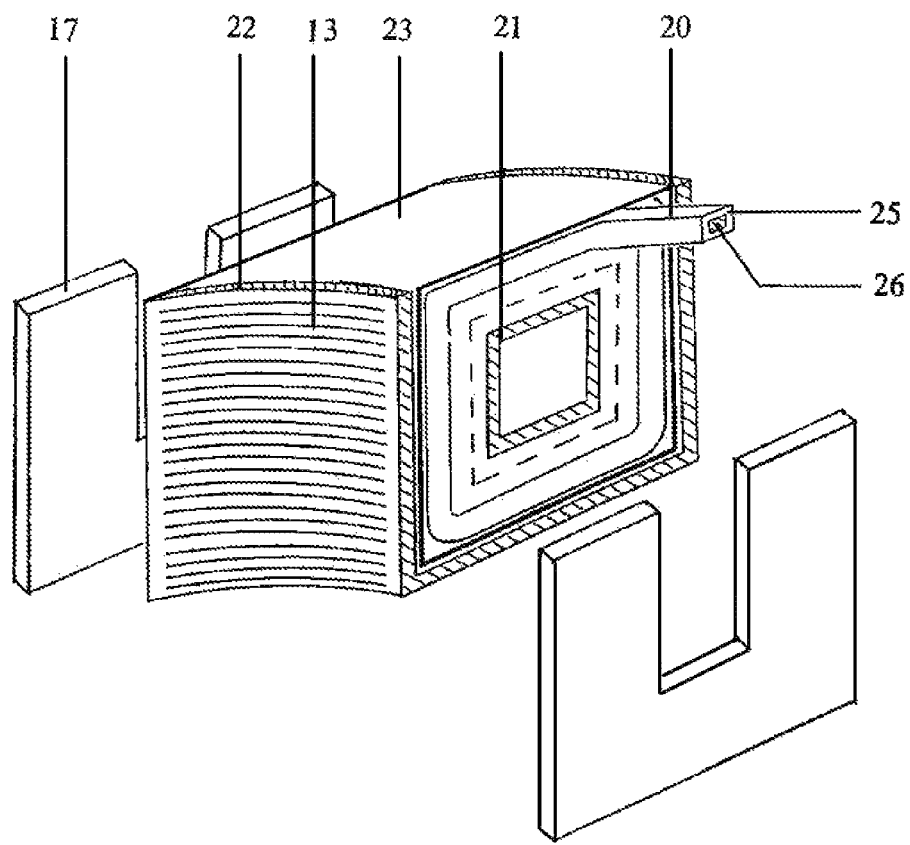
FIG. 10 is a structure drawing of a conductive wire unit provided in another embodiment of the invention.

FIG. 10 is a structure drawing of a conductive wire unit provided in another embodiment in the invention. As shown in FIG. 10, the main difference between the conductive wire unit in the embodiment shown in FIG. 8 and the conductive wire unit of this embodiment lies in that the conductive wires 18 are different, otherwise the conductive wire units in the two embodiments have similar structure. In this embodiment, conductive wire 18 has an iron core. As shown in FIG. 10, conductive wire 18 has an iron core 26, for example, with a square cross section, iron core 26 is coated with a conductive layer 25 (the conductive layer can be made of metal with good conductivity such as copper, aluminum), conductive layer 25 is coated with an insulation layer 20. Iron core 26 can be made of pure iron, silicon iron, RE-Fe alloy, etc. or the mixture thereof.

In some applications, preferably, the thickness of insulation layer 20 does not exceed 0.2 mm, the thickness of conductive layer 25 does not exceed 0.5 mm, and the side length of the square cross section of iron core 26 is larger than 0.01 mm.

Figure 11:
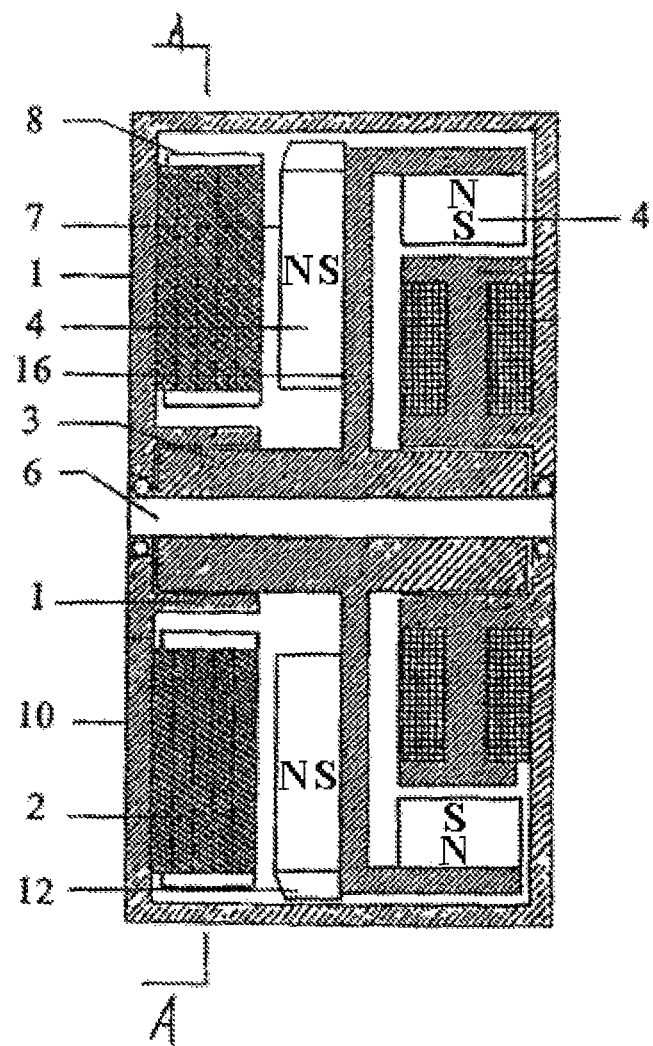
FIG. 11 is a structure drawing of a DC generator provided in an embodiment of the invention.
Figure 12:
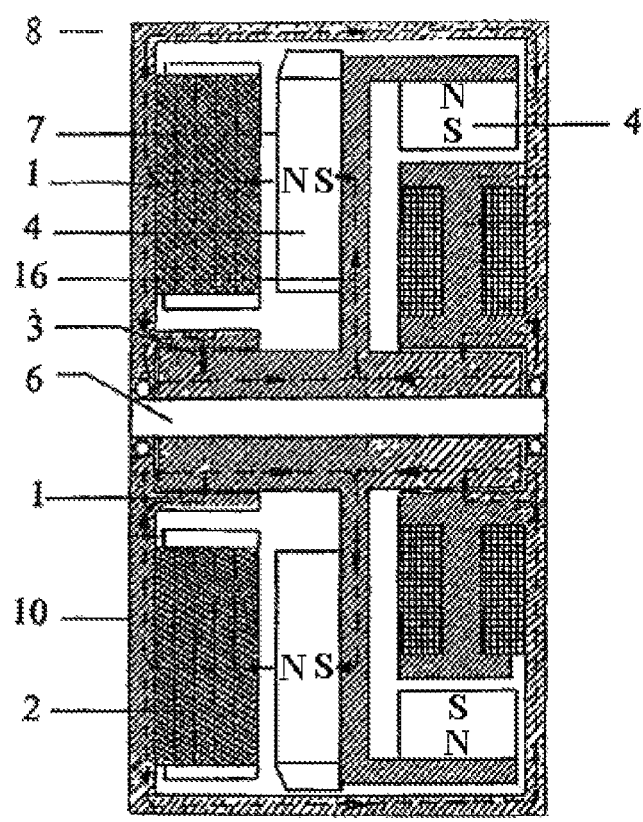
FIG. 12 is a drawing of magnetic force line of a rotor of a DC generator provided in FIG. 11.

In FIGS. 11 and 12, FIG. 11 is a structure drawing of a DC generator with closed-magnetic-path coils provided in an embodiment of the invention. FIG. 12 is a drawing of magnetic force line (as shown in dotted line in the FIG. 12) of a rotor of a DC generator in FIG. 11.

Figure 13:
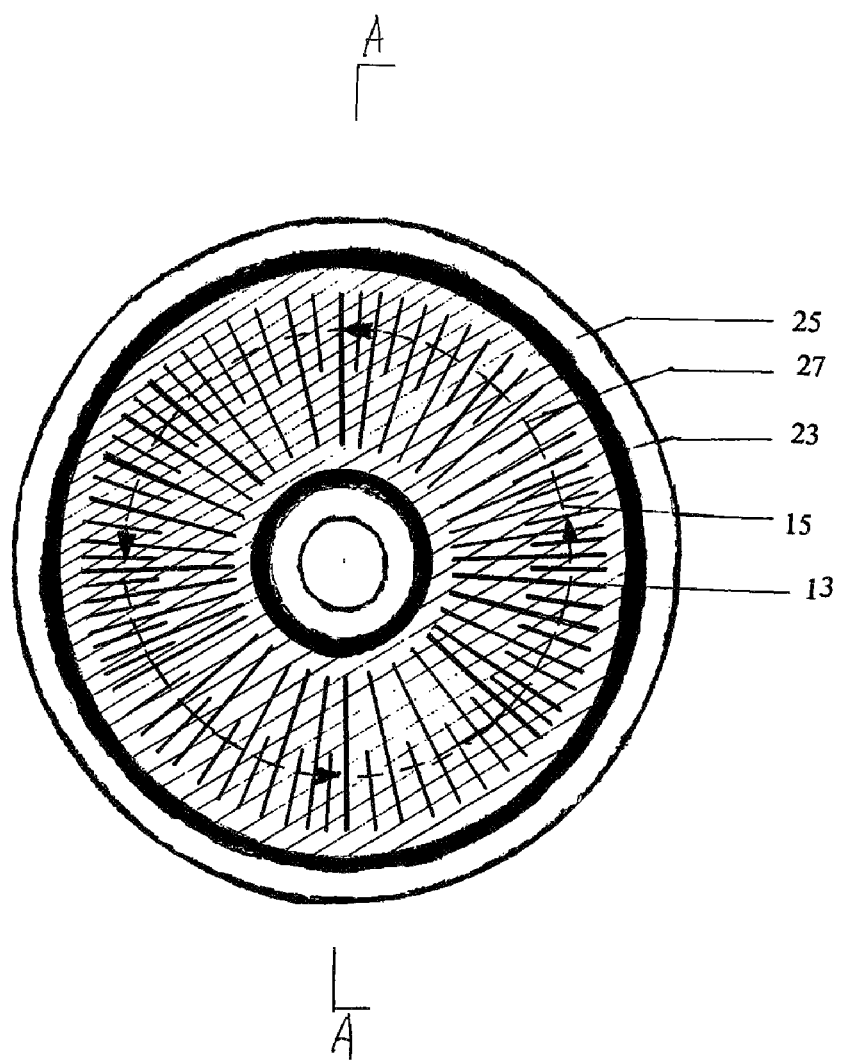
FIG. 13 is a drawing of magnetic force line of a conductive wire unit of a DC generator provided in FIG. 11.
Figure 14:
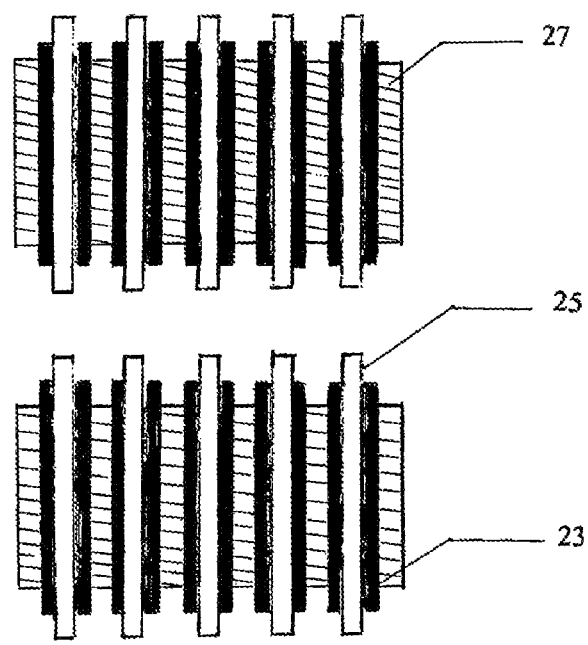
FIG. 14 is a section drawing of a conductive wire unit in FIG. 13.

FIGS. 13 and 14 show another embodiment of the conductive wire unit of the present invention. As shown in FIGS. 13 and 14, the conductive wire unit comprises a disc-shaped magnetic-conducting base plate with an optional central hole (not sown), and one or more disc-shaped basic conductive wire unit. Each basic conductive wire unit comprises a disc-shaped electrical-conducting sheet 25 with an optional central hole which can be made of copper or aluminum and a disc-shaped magnetic-conducting sheet 27 with an optional central hole separated by an insulation layer 23 also with a disc shape and an optional central hole. A plurality of elongated through gaps 13 are provided on electric-conducting sheet 25 and magnetic-conducting sheet 27 along radial direction. Another disc-shaped insulation layer 23 is provided on another side of the disc-shaped electrical-conducting sheet 25. The diameter of disc-shaped electrical-conducting sheet 25 is larger than that of disc-shaped magnetic-conducting sheet 27 and that of disc-shaped insulation layer 23. The diameter of disc-shaped insulation layer 23 is larger than that of disc-shaped magnetic-conducting base plate 21 and that of disc-shaped magnetic-conducting sheet 27. The diameter of disc-shaped magnetic-conducting base plate 21 equals to that of disc-shaped magnetic-conducting sheet 27. A plurality of the disc-shaped basic conductive wire units are stacked on each other to form a conductive wire unit shown in FIG. 14. The stacked disc-shaped basic conductive wire units is placed on the disc-shaped magnetic-conducting base plate 21 and a disc-shaped insulation layer 23 is provided between disc-shaped electrical-conducting sheet 25 and disc-shaped magnetic-conducting base plate 21 to form another conductive wire unit. The conductive wire unit shown in FIG. 14 contains 5 basic conductive wire units. Clearly, the conductive wire unit can contain different numbers of the basic conductive wire units. The diameter and thickness of disc-shaped magnetic-conducting base plate 21, a disc-shaped insulation layer, disc-shaped electrical-conducting sheet 25 and disc-shaped magnetic-conducting sheet 27 can be determined according to the size and output power of a generator.

FIG. 11 shows the structure of a direct current (DC) generator according to an embodiment of the present invention. FIG. 12 shows the magnetic lines of the rotor in the generator shown in FIG. 11. FIG. 13 shows the magnetic lines of the stator in the generator shown in FIG. 11. As shown in FIG. 11, a first end cover and a second end cover in which a magnetic yoke 1 is arranged are fixed on a case 10, wherein a plurality of magnetic-conducting sheet such as magnetic-conducting sheet 27 are stacked together to form the first end cover, the second end cover and the case 10. A transmission shaft 6, on which a rotor 7 is fixed, is arranged between the first end cover and the second end cover and is in rotational connection with the first end cover and the second end cover.

At least one conductive wire unit 2 is fixedly connected to the first end cover (at the left side end cover in FIG. 11). Conductive wire unit 2 has a structure as shown in FIG. 14, including a plurality of disc-shaped basic conductive wire units, each disc-shaped basic conductive wire unit consisting of an electric-conducting sheet 25, a magnetic-conducting sheet 27, an insulation layer 23 separating the electric-conducting sheet 25 and the magnetic-conducting sheet 27, and another insulation layer 23 provided on another side of the electrical-conducting sheet 25. A plurality of elongated through gaps 13 are formed on disc-shaped electrical-conducting sheet 25 along its radial direction as shown in FIG. 13. Preferably, the width of gap 13 does not exceed 1 mm. With the elongated through gaps 13, disc-shaped electrical-conducting sheet 25 forms a parallel-connected conductive wire structure, in which the outer circumference of disc-shaped electrical-conducting sheet 25 functions as an electrode while the center or inner circumference of disc-shaped electrical-conducting sheet 25 functions as another electrode. The portions divided by gaps 13 between the two electrodes constitute parallel-connected conductive wires which are cut by magnetic lines to generate induced electrical current. Different disc-shaped electrical-conducting sheets 25 can be electrically connected in parallel, i.e., the outer circumferences of different disc-shaped electrical-conducting sheets 25 are electrically connected, and the centers or inner circumferences of different disc-shaped electrical-conducting sheets 25 are electrically connected. Different disc-shaped electrical-conducting sheets 25 can be electrically connected in series, i.e., the outer circumference of a disc-shaped electrical-conducting sheet 25 is electrically connected with the center or inner circumference of another disc-shaped electrical-conducting sheet 25. It is also possible to divide disc-shaped electrical-conducting sheets 25 into groups, disc-shaped electrical-conducting sheets 25 in each group are electrically connected in parallel, and different groups are connected in series in a similar way as described in previous embodiments. A connector lug can be provided at the outer circumference and the center or inner circumference of the disc-shaped electrical-conducting sheet 25, respectively, for electrical connection. A coil set (for example, an excitation conductive wire unit) for a driving motor is fixedly connected on the second end cover.

The rotor 7 can comprise: a magnetic-conducting barrel which is formed by stacking barrel-shaped magnetic-conducting sheets 16, and at least one magnet 4 fixed on the outer surface of the bottom wall of the magnetic-conducting barrel. The thickness of the barrel-shaped magnetic-conducting sheet 16 is bigger than 0.01 mm. One magnetic pole of the magnet 4 on the rotor 7 is arranged directly facing conductive wire unit 2 of the stator 8, so that conductive wire unit 2 is cut by magnetic lines when rotor 7 rotates. Another magnet 4 is fixed inside the magnetic-conducting barrel and corresponds to the coil set for a driving motor.

As shown in FIG. 12, two closed magnetic paths are generated in the DC generator with the above structure. Magnetic force line 15 of the magnet 4 on the rotor 7 starts form N pole, passes through the gap between the magnet 4 and the conductive wire unit 2, enters into and passes through the conductive wire unit 2, enters into the two end covers (the first end cover and the second end cover) and the case 10, passes through the magnetic-conducting sheet 3 on the transmission shaft 6 and the magnetic-conducting sheets 16 of the rotor 7, and then returns to S pole of the magnet 4, which forms one closed loop of the magnetic force line 15 of the magnet 4 on the rotor 7.

As shown in FIG. 13, the magnetic force line 15 of the magnetic field generated by the electrical current flowing in conductive wire unit 2 is concentrated in the disc-shaped magnetic-conducting sheets 27 in the conductive wire unit 2. A closed loop of the magnetic force line 15 of the magnetic field is formed in the disc-shaped magnetic-conducting sheets 27. Therefore, the above two closed magnetic paths do not affect each other. The rotor 7 only needs to overcome its friction force, the attracting force of the magnetic-conducting sheets of the conductive wire unit 2 on the stator 7, and the acting force of magnetic leakage in the case 10, so that the rotor is driven to rotate by a prime motor or a driving motor, so as to generate electrical current by the generator with closed magnetic paths.

Furthermore, in this embodiment the thickness of the insulation layer 23 does not exceed 1 mm, the thickness of the disc-shaped magnetic-conducting sheet 27 is not less than 0.01 mm. The elongated through gaps 13 with a width of less than 0.5 mm are arranged in the radial direction of the disc-shaped magnetic-conducting sheet 27. Preferably, the through gaps 13 and the spaces between the through gaps 13 have equal radian, equal distance and are symmetrical around the center. The thickness of the disc-shaped electrical-conducting sheet 25 is not less than 0.01 mm. The elongated through gaps 13 with the width of not more than 0.5 mm is arranged on the radial direction of the disc-shaped electrical-conducting sheet 25. The through gaps 13 and the spaces between the through gaps 13 have equal radian, equal distance and are symmetrical around the center. The through gaps 13 on magnetic-conducting sheet 27 can be equal to, shorter than, or longer than that on the electrical-conducting sheet 25. In one embodiment, the through gaps 13 in the disc-shaped magnetic-conducting sheet 27 do not overlap with that on the disc-shaped electrical-conducting sheet 25. The diameter of the electrical-conducting sheet 25 is 05 mm longer than the diameter of the insulation layer 23. The diameter of the magnetic-conducting sheet 27 is 05 mm shorter than the diameter of the insulation layer 23. In the conductive wire unit 2, the magnetic-conducting sheet 27, the electrical-conducting sheet 25 and the insulation layer 23 are adhesively pressed together integrally.

According to the practical needs, the cross section area S1 for passing magnetic force line on the magnetic-conducting base plate 21 of the conductive wire unit 2 of the stator 8 can be larger than the sum of the cross section area S2 of one magnetic pole of the corresponding magnet 4 on the rotor 7 and the cross section area S3 for passing the magnetic force line 15 on the magnetic-conducting sheet 27 of the conductive wire unit 2, i.e., S1>S2+S3.

Figure 15:
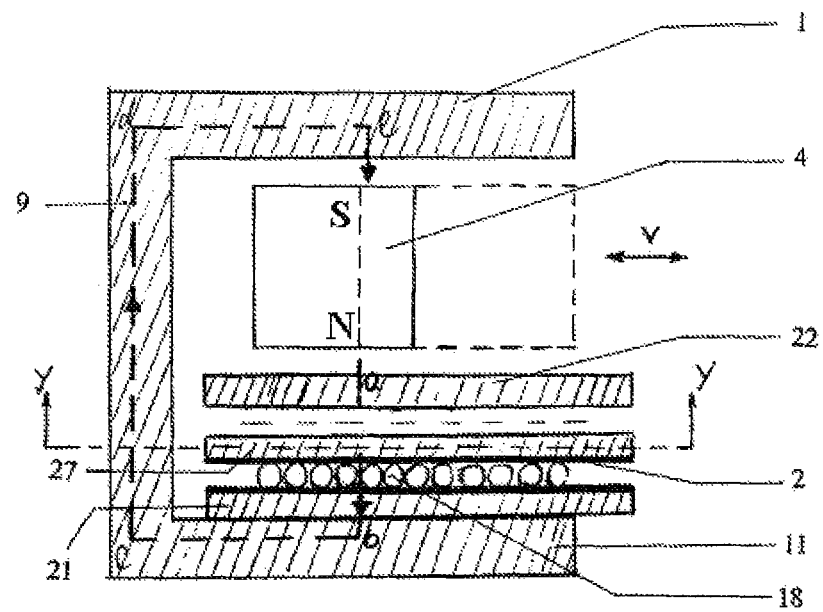
FIG. 15 is a drawing of principle of one DC generator provided in the invention.
Figure 16:
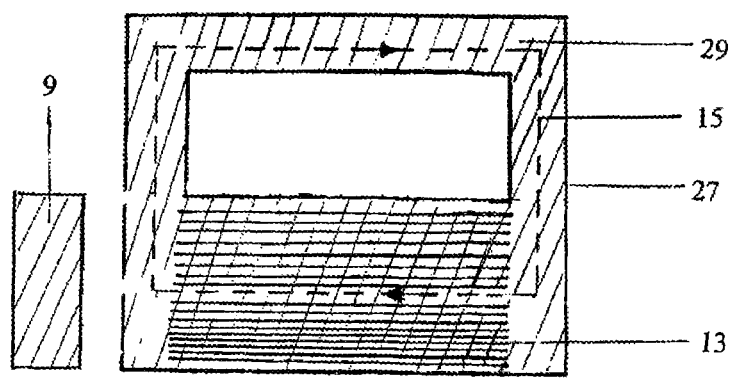
FIG. 16 is a section drawing of a conductive wire unit in FIG. 15.

FIG. 14 is a section drawing of a conductive wire unit in FIG. 13. As shown in FIG. 14, the conductive wire unit comprises at least one conductive wire unit which is a conductive wire unit 2. The conductive wire unit 2 comprises a round-shaped copper sheet 25, a round-shaped magnetic-conducting sheet 27, a round-shaped base plate, an insulation layer magnetic-conducting FIG. 15 is a drawing illustrating the principle of a DC generator provided in the embodiment of the invention. FIG. 16 is a cross sectional view of the stator in FIG. 15. As shown in FIG. 15, the DC generator comprises a magnet 4; a coil support frame 9; a pedestal 11; and a conductive wire unit 2 including one or more stacked basic conductive wire units, a magnetic-conducting base plate 21 and an optional magnetic-conducting cover sheet 22, etc.

The basic conductive wire unit comprises a conductive wire layer consisting of a plurality of conductive wires coated with insulation layer and arranged in parallel to each other, an insulation layer 23, a magnetic-conducting sheet 27. The magnetic-conducting base plate 21, the magnetic-conducting cover sheet 22 and the magnetic-conducting sheet 27 can be made of silicon iron sheet. The diameter of the varnished wire 18 can be 0.01 mm. The magnetic-conducting sheet 27 and the optional magnetic-conducting cover sheet 22 can have a flat square shape with a rectangular through opening. The rectangular through opening is positioned near one side, dividing the square-shaped magnetic-conducting sheet 27 into an upper narrow portion 29 and a lower broad portion as shown in FIG. 16. A layer of conductive wires 18 is provided on the lower broad portion. Conductive wires 18 are arranged in parallel to each other and extending from the broad portion to the narrow portion. In the broad portion, elongated through gaps 13 with a width less than 0.5 mm are formed in a direction perpendicular to the conductive wires 18. The thickness at the broad portion of magnetic-conducting sheet 27 is greater than 0.001 mm. The cross sectional area of the magnetic-conducting sheet 27 through which magnetic force line passes is bigger than the sum of the cross sectional areas of the magnetic force line 15 of the magnetic field generated by one magnetic pole of the magnet 4 and one layer of the conductive wires 18 in the conductive wire unit 2. The narrow portion 29 is not provided with conductive wire 18. The thickness of the narrow portion 29 of the magnetic-conducting sheet 27 is more than 0.001 mm. The cross sectional area of the narrow portion 29 through which the magnetic force line passes is bigger than the cross sectional area needed for passing the magnetic force line 15 generated by one layer of conductive wires 18 in the conductive wire unit 2.

An insulation layer 23, a conductive wire layer of conductive wires 18, anther insulation layer 23, and a magnetic-conducting sheet 27 are arranged in sequence to constitute one basic conductive wire unit. A plurality of the basic conductive wire units are stacked on a magnetic-conducting base plate 21, and an optional magnetic-conducting plate 22 is stacked on the other side of the plurality of the basic conductive wire units to constitute a conductive wire unit 2. The optional magnetic-conducting cover sheet 22 or a magnetic-conducting sheet 27 (if magnetic-conducting cover sheet 22 is not present) faces one magnetic pole of the magnet 4 on the rotor 7 conductive wire unit. The magnet 4 moves back and forth as shown by the arrows V in FIG. 15 causing the conductive wire layer is cut by magnetic lines so as to generate induced current.

The conductive wire unit 2 is fixed on the pedestal 11, the pedestal 11 and the coil support frame 9 form an integral structure. Both of the pedestal 11 and the coil support frame 9 are formed by magnetic-conducting sheets such as those made of the same material as the magnetic-conducting-conducting sheet 27.

One surface of the coil support frame 9 faces S magnetic pole surface of the magnet 4, and one surface of the conductive wire unit 2 faces N magnetic pole surface of the magnet 4. The distance between the coil support frame 9 and the magnetic pole surface of the magnet 4 and that between the conductive wire unit 2 and the magnetic pole surface of the magnet 4 are maintained at 0.1-0.3 mm, for example at 0.15 mm.

The areas of the coil support frame 9 and the conductive wire unit 2 facing each corresponding magnetic pole surface of the magnet 4 are 2-3 times, for example 2.5 times of that of each corresponding magnetic pole surface of the magnet 4, respectively. The magnet 4 makes back and forth circular movement between the coil support frame 9 and the conductive wire unit 2. When the magnet 4 makes back and forth circular movement, the magnetic force line of the magnet 4 starts from N pole, passes through the gap between the magnet 4 and the conductive wire unit 2, reaches magnetic-conducting sheet 27 (such as silicon iron sheet) of the conductive wire unit 2, passes through the conductive wire unit 2 as well as the pedestal 11 and the coil support frame 9, reaches the gap between the magnet 4 and the coil support frame 9, and returns to S magnetic pole of the magnet 4, which forms one closed loop of magnetic force line 15 of the magnet 4 (as shown by the dotted lines of "abcde" in FIG. 15). When the magnet 4 makes back and forth circular movement, the conductive wire unit 2 is cut by the magnetic force line of N magnetic pole of the magnet 4, and current is generated in the conductive wire unit 2. The magnetic force line 15 of the magnetic field generated by the current is concentrated in, passes through the narrow portion 29 of the magnetic-conducting sheet 27 and forms one closed loop of magnetic force line of the magnetic field in the conductive wire unit 2.

Hence, the magnetic field generated by the current in the conductive wire unit 2 does not affect the back and forth movement of the magnet 4. A generator with closed-magnetic-path, which is designed and manufactured through the abovementioned principles, has the advantage of high working efficiency.

Figure 17:
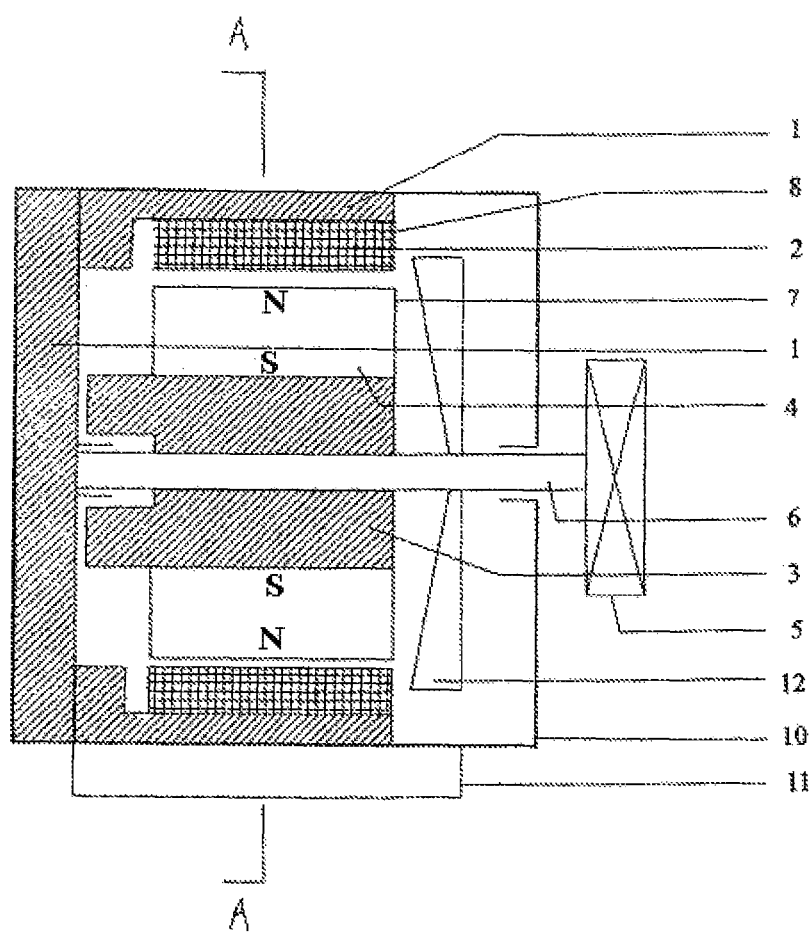
FIG. 17 is a structure drawing of a DC generator provided in an embodiment of the invention.

FIG. 17 is a structure drawing of a DC generator provided in an embodiment of the invention. In FIG. 17, a DC generator with single-stage excitation winding closed-magnetic-path comprises a case 10, a pedestal 11, a magnetic yoke 1, a first end cover, a second end cover, a stator 8, a conductive wire unit 2, a rotor 7, a transmission shaft 6 and a fan 12.

The magnetic yoke 1 and the first end cover are fixed in the case 10. The first end cover and the magnetic yoke 1 are formed by magnetic-conducting sheets, for example, with the same material as that of magnetic-conducting sheet 27. The magnetic-conducting sheets of the case 10 and magnetic yoke 1 are stacked integrally and form cylinder shape. The thickness of each magnetic-conducting-conducting sheet is more than 0.1 mm. In the invention, the cross sectional area S1 of the magnetic yoke 1 through which magnetic force line passes is bigger than the sum of the cross sectional area S2 of one corresponding magnetic pole surface of a magnet 4 and the cross sectional area S3 needed for passing the magnetic force line 15 generated by the conductive wire unit 2, i.e., S1>S2+S3.

The first end cover, the second end cover and the case 10 are fixedly connected with each other. The transmission shaft 6 is passed through and rotatably connected to the first end cover and the second end cover. The second end cover only serves as mechanical support for the rotating of shaft 6. One end of the transmission shaft 6 is fixedly connected with the fan 12. Furthermore, the same end of the transmission shaft 6 is fixedly connected with transmission wheels 5 into which power is input. A rotor 7 is fixed on the transmission shaft 6 in the case 10. The rotor 7 comprises at least one layer of circular magnetic-conducting sheets 3 which are fixedly connected to each other. The circular magnetic-conducting sheets 3 are fixedly connected to the transmission shaft 6. At least one cylinder-shaped magnet 4 is fixed on the circular magnetic-conducting sheets 3. The thickness of the magnetic-conducting sheet 3 is more than 0.1 mm.

The N magnetic pole surfaces with the same magnetic property of the magnet 4 correspond to the profile of the arc-shaped bottom wall of the magnetic-conducting cover sheet 22 of the conductive wire unit 2. The S magnetic pole surfaces with different magnetic property of the magnet 4 are fixedly connected to the circular magnetic-conducting sheet 3 of the rotor 7.

It should be understood that the conductive wire unit 2 in this embodiment can be any of the conductive wire units shown in FIGS. 5-7. The conductive wire unit 2 is inserted along axial direction into case 10 and fixedly connected on the magnetic yoke 1. The space between the surface of magnetic yoke 1 and the surface of the outmost magnetic-conducting sheet 27 of the conductive wire unit 2 should be as small as possible wherein the magnet 4 is inserted into the through center hole of cylindrical magnetic-conducting cover sheet 22.

The conductive wire unit 2 is sleeved axially into case 10 and fixed to the cylinder-shaped magnetic yoke 1 of the case 10. The gap between the cylindrical magnetic yoke 1 and the outmost magnetic-conducting sheet 27 of the conductive wire unit 2 should be as small as possible, preferably, there is no gap therebetween. The corresponding magnetic pole surface of the magnet 4 facing the cylindrical magnetic-conducting cover sheet 22 of the conductive wire unit 2 is also cylinder-shaped. The corresponding magnetic pole surface of the magnet 4 and the cylindrical inner surface of the magnetic-conducting cover sheet 22 are coaxial. The gap between the inner surface of the magnetic-conducting cover sheet 22 of the conductive wire unit 2 and the magnetic pole surface of the rotor 7 is less than 0.5 mm. The magnetic yoke 1 and the conductive wire unit 2 are fixedly connected to form the stator 8.

When the DC generator with closed-magnetic-path coils of the invention operates, transmission wheel 5 is driven by a prime motor or a driving motor. A rotor 7 is driven to rotate via a transmission shaft by the transmission wheel 5. Hence, a magnet 4 fixed on the rotor 7 is rotated, and the conductive wire unit 2 is cut by the magnetic force line of the magnet 4, so that current is generated by the conductive wire unit 2.

Figure 18:
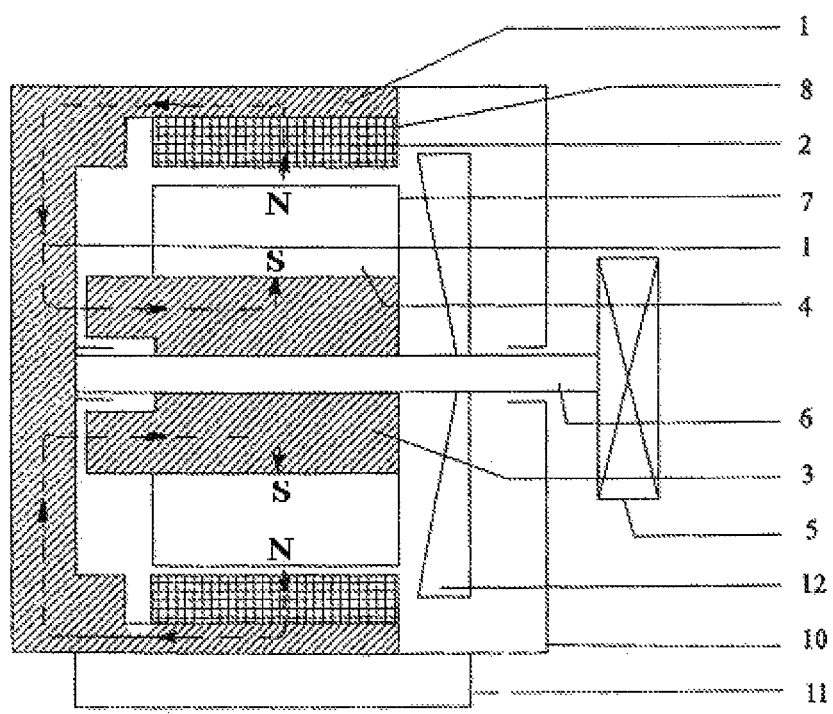
FIG. 18 is a drawing of magnetic force line of a rotor of a generator provided in FIG. 17.

FIG. 18 is a drawing of magnetic force line of a rotor 7 of a generator in the embodiment as shown in FIG. 17. FIG. 18 shows the passing route of the magnetic force line 15 of at least one magnet 4 on the rotor 7. The magnetic force line 15 of the magnet 4 starts from N magnetic pole, passes through the gap between the magnet 4 and the conductive wire unit 2, enters into and passes through the conductive wire unit 2, enters into and passes through the magnetic yoke 1, passes through magnetic-conducting sheet 3 of transmission shaft 6, reaches the rotor 7 and returns to S magnetic pole of the magnet 4, thereby forming a close loop of the magnetic line 15 of at least one magnet 4.

Figure 19:
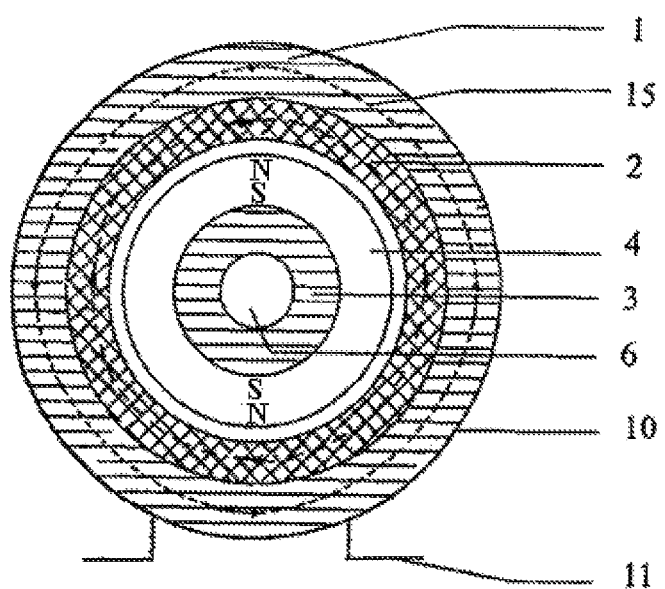
FIG. 19 is a drawing of magnetic force line of a conductive wire unit of a generator provided in FIG. 17.

FIG. 19 is a drawing of magnetic force line of a stator of a generator provided in FIG. 17. FIG. 19 shows a drawing of the magnetic force line on the cross section cut along the line A-A in FIG. 17. The loop of the magnetic force line is specifically the route through which the magnetic force line generated by the conductive wire unit 2 of the stator 8. In the case 10, the conductive wire unit 2 is sleeved axially into and fixed on the inner surface of the cylinder-shaped magnetic yoke 1. The magnetic-conducting cover sheet 22 of the conductive wire unit 2 corresponds to one magnetic pole of the magnet 4 of the rotor 7. The transmission wheel 5 is driven by a prime motor or a driving motor to drive the rotor 7 to rotate. The magnet 4 is hence rotated. The conductive wire unit 2 is cut by the magnetic lines generated by the magnet 4 and a loop current is generated. The magnetic force line of the magnetic field generated by current is concentrated on and passes through the magnetic-conducting sheets in the cylinder-shaped magnetic yoke 1 and the magnetic-conducting sheets 27 of the cylinder-shaped conductive wire unit 2. Therefore, two closed loops of the magnetic force line of the magnetic field are formed in the conductive wire unit 2 and the stator 8. These two closed magnetic paths do not affect each other and, hence, the efficiency of the generator is improved.

Figure 20:
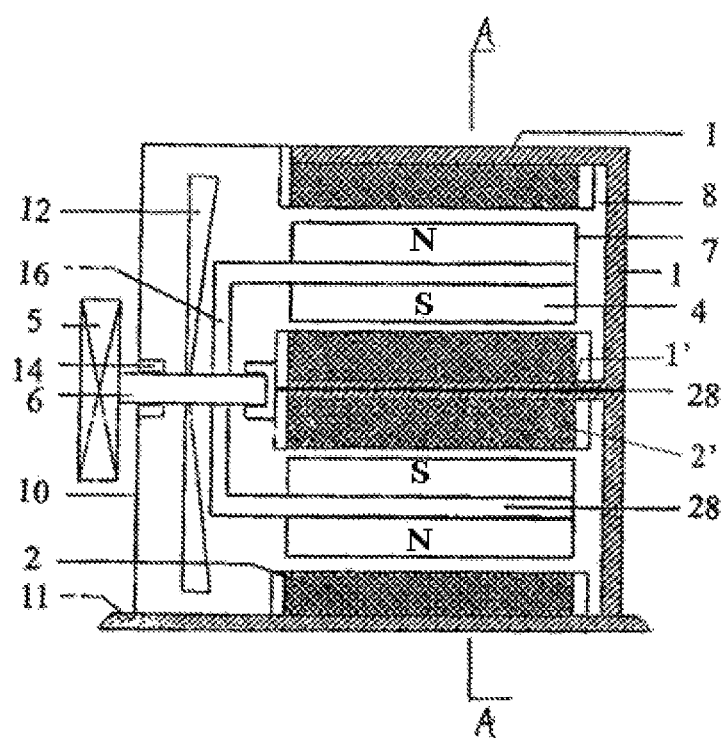
FIG. 20 is a structure drawing of another DC generator provided in an embodiment of the invention.

FIG. 20 is a structure drawing of another DC generator provided in another embodiment of the invention. FIG. 20 shows a DC generator with a double-stage excitation winding closed-magnetic-path coils, which comprises a case 10, a pedestal 11, a magnetic yoke 1, a magnetic yoke 1', a first end cover, a second end cover, a conductive wire unit 2 and 2', a stator 8, a rotor 7, a transmission shaft 6 and a fan 12.

The magnetic yoke 1 is fixed on the case 10 and has cylinder shape. The magnetic 1' is fixed on the first end cover and has a column shape. Both of the magnetic yoke 1 and the magnetic yoke 1' are formed by a plurality of magnetic-conducting sheets stacked together integrally. The center of the magnetic yoke 1' is provided with a rod 28' which is used for facilitating to integrally stack the magnetic-conducting sheets of the magnetic yoke 1', so that the cylinder-shaped conductive wire unit 2' is conveniently fixed and sleeved onto magnetic yoke 1'. The rod 28' is fixed on the middle part of the first end cover. The thickness of the magnetic-conducting sheet of the magnetic yoke at the part is more than 0.1 mm. The cross sectional area S1 for passing the magnetic force line 15 of the magnetic yokes 1 and 1' is bigger than the sum of the cross sectional area S3 needed to pass the magnetic force line generated by the conductive wire unit 2 and the cross sectional area S2 of the corresponding magnetic pole surface of a magnet 4.

The first end cover and the second end cover are fixedly connected to the case 10. The transmission shaft 6 is provided between the first end cover and the second end cover. The second end cover only serves as the mechanical support for rotating transmission shaft 6. The fan 12 is fixedly connected to the transmission shaft 6; furthermore, the same end of the transmission shaft 6 that extrudes out of the case 10 is connected to a transmission wheel 5 for inputting power. The rotor 7 is fixed on the transmission shaft 6 in the case 10.

In an embodiment, the rotor 7 comprises an aluminum alloy disk 16, rod 28' and magnet 4. The aluminum alloy disk 16 is fixedly and coaxially connected to the transmission shaft 6. At least three rods 28' such as metal rods are fixedly connected to the disk 16. At least one magnet 4 is fixedly connected to the rod 28'. The magnetic N pole surface of the magnet 4 corresponds to the profile (for example, the profile of the magnetic-conducting cover sheet 22) of the arc-shaped surface of the conductive wire unit 2. The other magnetic S pole surface corresponds to the profile of the arc-shaped surface of the conductive wire unit 2' fixed on the column-shaped magnetic yoke 1'. Therefore, the rotor disk 16, the rod 28' and the magnet 4 are connected to constitute the rotor 7.

The conductive wire unit conductive wire unit 2 and 2' can be any of the conductive wire unit in the embodiments described and shown in FIGS. 5-7. The conductive wire unit 2 is axially sleeved and fixed on the inner surface of the cylinder-shaped magnetic yoke 1 in the case 10. The conductive wire unit 2' is axially sleeved and fixed on the outer surface of the column-shaped magnetic yoke 1' on the first end cover. The gap between the outmost magnetic-conducting sheet, such as magnetic-conducting cover sheet 22 or magnetic-conducting sheet 27, of the conductive wire unit 2 and the magnetic yoke 1 should be as small as possible, for example, there is no gap therebetween. The gap between the outmost magnetic-conducting, such as magnetic-conducting base plate 21 or magnetic-conducting sheet 27, of the conductive wire unit 2' and the magnetic yoke 1' should be as small as possible, for example, there is no gap therebetween. The gap between the surface of conductive wire unit 2, 2' and the corresponding magnetic pole surface is less than 0.5 mm. The magnetic yoke 1 and the conductive wire unit 2 as well as the magnetic yoke 1' and the conductive wire unit 2' are fixed and constitute the stator 8.

When the DC generator with closed-magnetic-path coils according to the present invention operates, the transmission wheel 5 is driven by a prime motor or a driving motor. The rotor 7 is driven to rotate through the transmission shaft 6 by the transmission wheel 5. The magnet 4 fixed on the rotor 7 is hence rotated. The conductive wire units 2 and 2' are cut by the magnetic force line of the magnet 4. Current is generated in the conductive wire units 2 and 2' after the conductive wire units 2 and 2' are induced.

Figure 21:
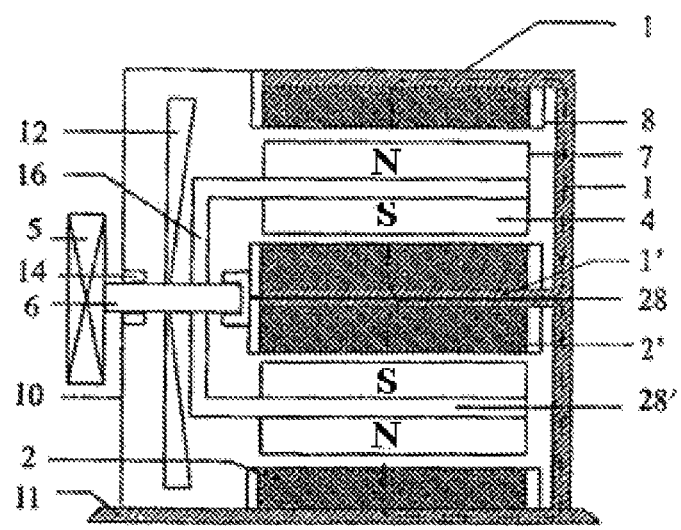
FIG. 21 is a drawing of magnetic force line of a rotor of a generator provided in FIG. 20.

FIG. 21 is a drawing of magnetic force line of a rotor 7 of a generator provided in FIG. 20. FIG. 21 shows the route through which the magnetic force line of at least one cylinder-shaped magnet 4. The magnetic force line 15 of the magnet 4 starts from N magnetic pole, passes through the gap between the magnet 4 and the conductive wire unit 2, enters into the conductive wire unit 2 for example via a magnetic-conducting cover sheet 22 (not shown), passes through the conductive wire unit 2, enters into the cylinder-shape magnetic yoke 1, and passes through the column-shaped magnetic yoke 1', and enters into the column-shape conductive wire unit 2', and then returns to S magnetic pole of the magnet 4 after passing through the conductive wire unit 2', which forms at least one closed loop of the magnetic force line of the magnet 4 on the rotor 7.

Figure 22:
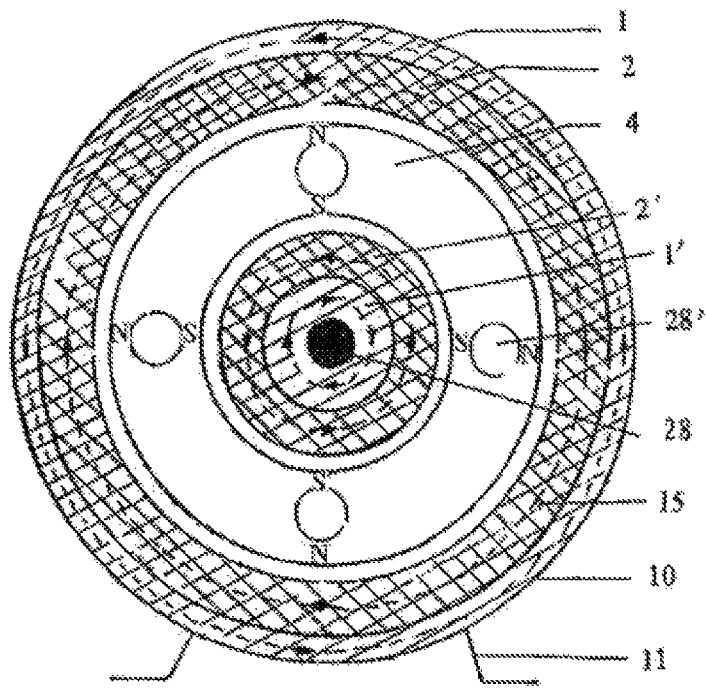
FIG. 22 is a drawing of magnetic force line of a conductive wire unit of a generator provided in FIG. 20.

FIG. 22 is a drawing of magnetic force line of a stator of a generator provided in FIG. 20. FIG. 22 shows a drawing of the magnetic force line of the cross section along the line A-A in FIG. 20. Specifically, the magnetic force line in FIG. 22 is the routes through which the magnetic force line 15 generated by the conductive wire unit 2 and/or 2' of the stator 8. In the case 10, the conductive wire unit 2 and the conductive wire unit 2' are axially sleeved and fixed on the corresponding magnetic yoke 1 and the magnetic yoke 1', respectively. The magnetic-conducting plates or sheets of the conductive wire units 2 and 2' respectively correspond to the magnetic poles of the magnet 4, as shown in FIG. 22.

The driving wheel 5 is driven by a prime motor or a driving motor and the rotor 7 is driven to rotate by the transmission shaft 6. The magnet 4 is then rotated. The two conductive wire units 2 and 2' are cut by magnetic lines of the magnet 4 and two loop currents are generated. The magnetic force line 15 of the magnetic field generated by the two currents is concentrated in the cylinder-shaped magnetic yoke 1 and the column-shaped magnetic yoke 1' as well as in the magnetic-conducting sheets 27 of the cylinder-shaped conductive wire unit 2 and the column-shaped conductive wire unit 2' and passes through them. Therefore, four closed loops of the magnetic force line are formed in the stator.

Figure 23:
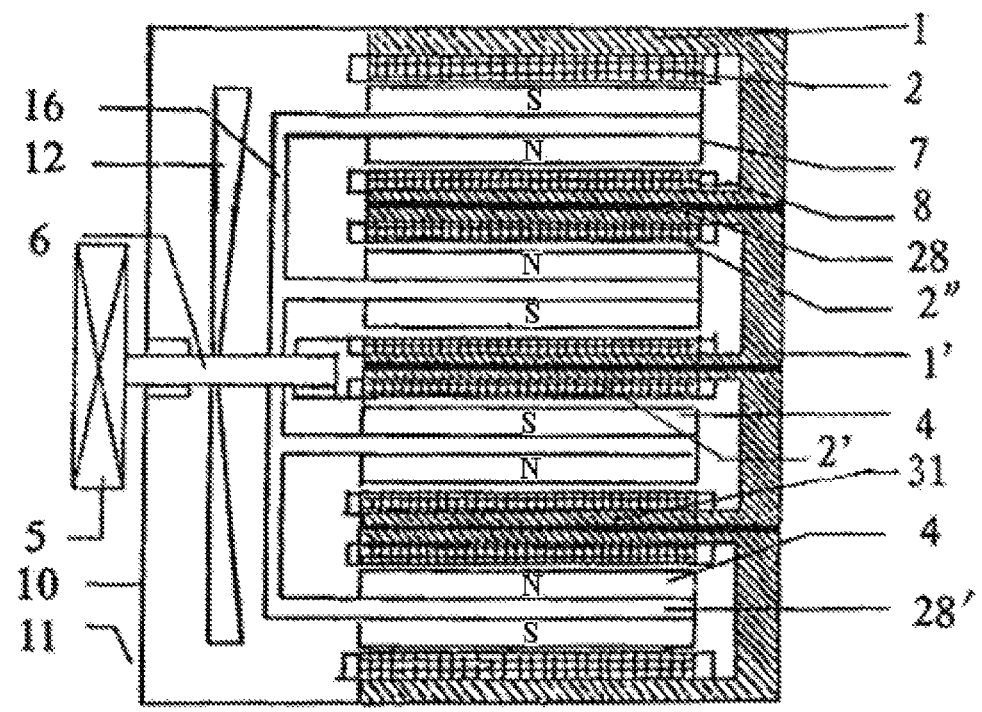
FIG. 23 is a structure drawing of another DC generator provided in an embodiment of the invention.

FIG. 23 is a structure drawing of another DC generator provided in an embodiment of the invention. FIG. 23 illustrates a DC generator with multi-stage excitation winding closed-magnetic-path, of which the structure is basically the same as the structure of DC generator with double-stage excitation winding closed magnetic-path as shown in FIG. 20. The main difference lies in that, in the DC generator as shown in FIG. 23. a conductive wire unit 2" is added to the stator 8. Magnet 4 is provided between conductive wire unit 2" and conductive wire unit 2' and between conductive wire unit 2" and conductive wire unit 2, respectively. Specifically, a magnetic yoke 31 is provided between magnetic yoke 1 and magnetic yoke 1' and coaxial with magnetic yoke 1'. One end of magnetic yoke 31 is fixedly connected to the first end cover. Conductive wire unit 2" is sleeved on magnetic yoke 31 to form an integral structure in the manner similar to that of magnetic yoke 1' and conductive wire unit 2'. At three magnetic yokes 31 are formed over three metal rods 28 which integrally fix stacked magnetic-conducting sheets into a cylindrical shape in a similar way as magnetic yoke 1' and rod 28 described above; At least three rods 28' for receiving additional magnet 4 are fixedly connected to disk-shaped magnetic-conducting sheet 16 on three equate spaced positions along a circumference between the centre and outer rods 28' of the disk-shaped magnetic-conducting sheet 16 (as shown in FIG. 23); the conductive wire unit 2" is fixedly sleeved on the cylinder-shaped magnetic yoke 31 to form an integral cylindrical-shaped structure.

Correspondingly, at least one additional cylinder-shaped magnet 4 (for example three or four additional magnets 4 are added in the embodiment as shown in FIG. 23) is added on the rotor 7. Specifically, the rotor 7 can comprise a disk-shaped magnetic-conducting sheet 16 (such as an aluminum alloy disk), two groups of rods 28' arranged along two circumferences of different diameter on the disk-shaped magnetic-conducting sheet 16 with the first group positioned closer to magnet yoke 1 and the second group positioned closer to magnetic yoke 1' and at least one magnet 4 fixed on each group of rods 28', respectively, for example three or four magnets 4 are arranged on each group of the rods 28' in the embodiment as shown in FIG. 23. in FIG. 23, the transmission shaft 6 is fixedly connected to the disk-shaped magnetic-conducting sheet 16, the disk-shaped magnetic-conducting sheet 16 is fixedly connected to at least two groups of rods 28', each group of rods 28' is fixedly connected to at least one cylinder-shaped magnet 4 sleeved on the rod 28'; in an embodiment there are at least three rods 28', in each group, each of the rods 28' is fixedly connected to one cylinder-shaped magnet 4 sleeved thereon; the S magnetic pole surface of the magnets 4 fixed on the second group of rods 28' faces the conductive wire unit 2' fixed on the column-shaped magnetic yoke 1'; the N magnetic pole surface of the magnets 4 fixed on the second group of rods 28' faces the conductive wire unit 2" fixed on the cylinder-shaped magnetic yoke 31.

The route that the magnetic force line 15 of all the magnets on the rotor 7 passes through can be determined in a similar way as described above. At least two magnetic force line 15 closed loops of the magnet 4 are formed on the rotor 7.

The route that the magnetic force line 15 of the magnetic field of the conductive wire units on the stator 8 can be determined in a similar way as described above. Eight magnetic force line closed loops of the magnetic field are formed in stator 8 in the embodiment.

Four coaxial layers of basic conductive wire units can be provided in each conductive wire unit 2 in this embodiment. It should be understood that the number of basic conductive wire units in a conductive wire unit 2 can vary and different conductive wire unit 2 can contain different number of basic conductive wire units according to the size and required output power of a generator. Usually, for larger output power of a generator, larger number of basic conductive wire units is used.

FIG. 24 is a structure drawing of a generator provided in another embodiment of the invention. As shown in FIG. 24, the generator in this embodiment of the invention comprises a case 10, a pedestal 11, a magnetic yoke 1, a coil support frame 9, a first end cover, a second end cover, a transmission shaft 6, a fan 12, a rotor 7 and a stator 8.

The magnetic yoke 1 is formed by stacking magnetic-conducting sheets such those made of the same material as magnetic-conducting sheet 27. The thickness of the magnetic-conducting sheet is larger than 0.1 mm. There are three circular protrusions formed on inner wall of the magnet yoke 1, extending toward the central axis of the magnetic yoke 1. The circular protrusion in the middle serves as the coil support frame 9. Cross sectional area S1 of the magnetic yoke 1 and the coil support frame 9 for passing the magnetic force line 15 therethrough is bigger than the sum of cross sectional area S3 needed for the magnetic force line 15 of the magnetic field generated by the conductive wire unit 2 to pass therethrough and cross sectional area S2 of one magnetic pole of the magnet 4.

The transmission shaft 6 is rotatably connected via bearings 14 on the first end cover and the second end cover, one end of the transmission shaft 6 is fixedly connected to the fan 12, the other end of the transmission shaft is fixedly connected to the transmission wheel 5 that inputs power; the rotor 7 is fixed on the transmission shaft 6 in the case 10.

The rotor 7 may comprise two parallel magnetic-conducting disks which are symmetrical about the middle circular protrusion on the inner wall of the magnet yoke 1, magnetic-conducting sheets 3 on the transmission shaft 6 and the magnet 4; the two disks are both composed of at least one layer of disk-shaped magnetic-conducting sheet. The thickness of the magnetic-conducting sheet is bigger than 0.1 mm.

The magnetic-conducting sheets 3 on the transmission shaft 6 are fixedly connected to the transmission shaft 6 and form a magnetic-conducting column; the two magnetic-conducting disks are integrally connected to the two ends of the magnetic-conducting column respectively. Thus, the two magnetic-conducting disks of the rotor 7 can fix at least two magnets 4; and the magnetic-conducting column can fix at least one magnet 4. The same kind N magnetic pole surface of the magnet 4 on the rotor 7 faces and corresponds to the profile of the conductive wire unit 2 on the stator 8 as shown in FIG. 24.

The coil support frame 9 of stator 8 is provided a plurality of grooves and/or projections along its circumference for receiving conductive wire unit 2. U-shaped conductive wire unit 2 in this embodiment can be any of the conductive wire units described in the embodiments as shown in FIGS. 1-4 and 8-10. A plurality of the U-shaped conductive wire units 2 are sleeved and fixed on the grooves and/or projections of the coil support frame 9 equally spaced from each other along the circumference of the coil support frame 9. In the embodiment as shown in FIG. 26, four conductive wire units 2 are provided on the coil support frame 9. Preferably, there is no gap between the coil support frame 9 and the magnetic-conducting base plate 21 which directly faces the coil support frame 9 or the grooves and/or projections thereof.

Three surfaces of the outmost magnetic-conducting cover sheet 22 or the outmost magnetic-conducting sheet 27 (if no sheet 22 is used) of the conductive wire unit 2 are in parallel with corresponding magnetic pole surfaces of the magnet 4, respectively, and the gap therebetween is smaller than 0.5 mm. Therefore the coil support frame 9 and the conductive wire unit 2 constitute the stator 8.

When the DC generator with closed-magnetic-path coils according to the embodiment of the invention operates, a prime motor or a driving motor drives the transmission wheel 5 to drive the rotor 7 to rotate through the transmission shaft 6, and the magnet 4 fixed on the rotor 7 follows to rotate; the magnetic force line of the magnet 4 cuts the conductive wire unit 2 which generates current after being inducted.

FIG. 25 is the magnetic force line drawing of the rotor of the generator provided in FIG. 24; FIG. 25 illustrates the route that the magnetic force line 15 of at least three magnets 4 on the rotor passes through: the magnetic force line 15 of the magnet 4 starts from N magnetic pole, enters the magnetic-conducting cover sheet 22 (not shown) and therefore the conductive wire unit 2 through the gap between the magnet 4 and the conductive wire unit 2, enters coil support frame 9 and the magnetic yoke 1 after passing through the conductive wire unit 2, and comes back to the S magnetic pole of the magnet 4 after passing through the magnetic yoke 1 and the magnetic-conducting sheet 3 fixed on the transmission shaft 6, thus at least three magnetic force line closed loops of at least three magnets 4 on the rotor 7 are formed.

FIG. 26 and FIG. 27 are two magnetic force line drawings of the stator of the generator provided in FIG. 24, FIG. 26 and FIG. 27 illustrate two routes that the magnetic force line 15 of the magnetic field generated by the conductive wire unit 2 on the stator 8 passes through.

In FIG. 26, the U-shaped conductive wire unit 2 of the stator is fixed in the case 10; the conductive wire unit 2 may be the same as any of the conductive wire units described in the embodiments shown in FIGS. 1-4, wherein the U-shaped conductive wire unit 2 is sleeved and fixed on the coil support frame 9 in the case 10.

In FIG. 27, the conductive wire unit 2 may be the same as any of the conductive wire units described in the embodiments shown in FIGS. 8-10, wherein the conductive wire unit 2 which has a square-shaped magnetic-conducting base plate 21 is inserted and fixed on the projections of the coil support frame 9 with the inner hollow space of the square-shaped magnetic-conducting base plate 21 receiving the projections; the gap between the base plate 21 of the conductive wire unit 2 and the coil support frame 9 should be as small as possible, preferably there is no gap therebetween; at this time, the shield plate 17 of the conductive wire unit 2 can be removed, the gap between the magnetic-conducting sheet 27 of the conductive wire unit 2 and the protruded portion of the magnetic yoke 1 can be 0 mm, the gap between adjacent coil support frames 9 can be 0 mm; therefore three surfaces of the magnetic-conducting cover sheet 22 on the conductive wire unit 2 correspond to the corresponding magnetic pole surfaces of the magnet 4, respectively.

The prime motor or the driving motor drives the transmission wheel 5 to drive the rotor 7 to rotate through the transmission wheel 6, the magnet 4 follows to rotate, the magnetic force line of the magnet 4 cuts four conductive wire units 2 to generate a DC current, the magnetic force line 15 of the magnetic field generated by the current is concentrated on and passes through the coil support frame 9, the magnetic yoke 1 and the magnetic-conducting sheet 27 in the conductive wire unit 2, thus at least two closed loops of the magnetic force line 15 are formed on the stator 8.

FIG. 28 and FIG. 29 are two magnetic force line drawings of the stator of the generator provided in FIG. 24, FIG. 28 and FIG. 29 illustrate two routes that the magnetic force line 15 of the magnetic field generated by the conductive wire unit 2 on the stator 8 passes through.

In FIG. 28, the U-shaped conductive wire unit 2 of the stator 8 is fixed in the case 10; the conductive wire unit 2 may be the same as any of the conductive wire units described in the embodiments shown in FIGS. 1-4, wherein the U-shaped conductive wire unit 2 is sleeved and fixed on the coil support frame 9 in the case 10.

In FIG. 29, the conductive wire unit 2 may be the same as any of the conductive wire units described in the embodiments shown in FIGS. 8-10, wherein the conductive wire unit 2 with a square-shaped magnetic-conducting base plate 21 is inserted and fixed on the projections of the coil support frame 9 in the case 10; the gap between the base plate 21 of the conductive wire unit 2 and the coil support frame 9 should be as small as possible, preferably there is no gap; at this time, the thickness of the lateral plate 17 of the conductive wire unit 2 is smaller than 10 mm, the gap between the outmost magnetic-conducting sheet 27 of the conductive wire unit 2 and the protruded portion of the magnetic yoke 1 is smaller than 10 mm, a through gap 13 is existed between two adjacent protruded portions which are fixedly connected to the magnetic yoke 1, the gap 13 between adjacent flat H-shaped coil support frames 9 is bigger than 3 mm; therefore three surfaces of the magnetic-conducting cover sheet 22 on the conductive wire unit 2 correspond to the corresponding magnetic pole surfaces of the magnets 4.

The prime motor or the driving motor drives the transmission wheel 5 to drive the rotor 7 to rotate through the transmission wheel 6, the magnet 4 follows to rotate, the magnetic force line of the magnet 4 cuts four conductive wire units 2 to generate a AC current, the magnetic force line 15 of the magnetic field generated by the current is concentrated on and passes through the coil support frame 9 and the magnetic yoke 1, thus at least two closed loops of the magnetic force line 15 are formed on the stator 8.

FIG. 24 is a structure drawing of four kinds of generators provided in an embodiment of the invention, the magnetic yokes 1 and flat H-shaped coil support frame 9 in the stator 8 of the four generators are of the same structure and the same shape, while the conductive wire units 2 which are installed and fixed on the coil support frame 9 are of different structures. FIG. 26, FIG. 27, FIG. 28 and FIG. 29 indicate the drawing of the magnetic force line on the cross section along the line A-A, also illustrate the through gap 13, the rotor 7 and the magnet 4 on the rotor 7. Wherein the magnetic force line is the routes that the magnetic force line 15 generated by different conductive wire units passes through; the combination of different conductive wire units 2, different through gaps 13 and different magnets 4 on different rotors 7 forms different generators.

In a specific embodiment, the gap 13 between adjacent flat H-shaped coil support frame 9 is 0 mm, the conductive wire unit 2 has no shield plate 17, the gap between the magnetic-conducting sheet 27 in the conductive wire unit 2 and the protruded portion of the magnetic yoke 1 is 0 mm, the same kind N magnetic pole surface of the magnet 4 on the rotor 7 corresponds to the profile of the magnetic-conducting cover sheet 22 on the conductive wire unit 2, so this generator is a DC generator, i.e. the structure of this generator is shown in FIG. 26 and FIG. 27;

In another specific embodiment, the through gap 13 between adjacent flat H-shaped coil support frame 9 is bigger than 0 mm, the conductive wire unit 2 has a shield plate 17, the gap between the magnetic-conducting sheet 27 in the conductive wire unit 2 and the protruded portion of the magnetic yoke 1 is bigger than 0 mm, the N magnetic pole surface of the magnet 4 on the rotor 7 corresponds to the profile of the magnetic-conducting cover sheet 22 on one conductive wire unit 2, the S magnetic pole surface of the magnet 4 corresponds to the profile of the magnetic-conducting cover sheet 22 on another conductive wire unit 2, so this generator is an AC generator, i.e., the structure of this generator is shown in FIG. 28 and FIG. 29.

Finally, it should be noted that: while the technical solution of the invention has been described in connection with the abovementioned embodiments, it is not intended for the invention to be limited solely to the embodiments described; to the contrary, it will be appreciated by a person skilled in that art that modifications, or equivalents or alternative solution without departing from the spirit of the invention or exceeding the scope of the technical solution about the technical solution shown should be encompassed. The conductive wire unit according to the present invention can be applied to various generators known in the art. The conductive wire unit according to the present invention can be applied to generators of different size and output power and of different kind. For example, the conductive wire unit according to the present invention can be applied to small sized portable generators for household electronic devices, to middle sized generators for vehicles, trains, or air planes, to large sized generators, by adjusting the dimension of the conductive wires and the magnetic-conducting sheets, the number of conductive wire layers of the conductive wire unit. The conductive wire unit of the present invention including the magnetic-conducting base plate, the magnetic-conducting cover sheet, the magnetic-conducting sheet, and the conductive wire layer can also take any proper shapes other than those specifically described in the embodiments.

What is claimed is:

1. A stator for a generator, comprising:
    a coil support frame; and
    a conductive wire unit arranged on the coil support frame;
    wherein the conductive wire unit comprises one basic conductive wire unit or a plurality of stacked basic conductive wire units, the basic conductive wire unit comprises a conductive wire layer and a magnetic-conducting sheet conformably stacked on and insulated from the conductive wire layer;
    wherein the conductive wire layer is formed by a single continuous conductive wire or bound multiple continuous conductive wires wound as a coil around a shaped magnetic-conducting base plate;
    wherein the conductive wire is an electrical-conducting wire formed by magnetic-conducting material, the electrical-conducting wire comprises an iron core, an electrical-conducting layer is coated on the iron core, and an insulation layer is coated on the electrical-conducting layer.

2. The stator for a generator according to claim 1, wherein a plurality of first elongated through gaps are formed on the magnetic-conducting sheet.

3. The stator for a generator according to claim 1, wherein,
    the stator is of cylindrical shape, a cylindrical conductive wire unit is formed on the cylindrical stator, the conductive wire unit comprises a cylindrical magnetic-conducting base plate, one or more cylindrical magnetic-conducting wire units are coaxially stacked over an outer surface of the cylindrical basic conductive wire unit, the cylindrical conductive wire unit comprises a conductive wire layer formed by arranging multiple conductive wires, which have insulation layer, along the cylindrical magnetic-conducting base plate, a cylindrical magnetic-conducting sheet is conformably stacked on an outer surface of the conductive wire layer.

4. The stator for a generator according to claim 1, wherein,
the stator is of square-shaped, a square-shaped conductive wire unit is formed on the square-shaped stator, the conductive wire unit comprises a square-shaped magnetic-conducting base plate, one or more square-shaped basic conductive wire units are conformably stacked over an outer surface of the square-shaped magnetic-conducting base plate layer by layer, wherein, the square-shaped basic conductive wire unit comprises a square-shaped solenoid and a magnetic-conducting sheet installed on an outer surface of the solenoid.

5. The stator for a generator according to claim 1, wherein,
the stator is of disc-shaped, a disc-shaped conductive wire unit is formed on the disc-shaped stator, the conductive wire unit comprises a conductive wire layer, the conductive wire layer comprises a disc-shaped electrical-conducting sheet and a disc-shaped magnetic-conducting sheet, a plurality of second elongated through gaps are formed on the electrical-conducting sheet, which extend from a central region of the electrical-conducting sheet to a circumferential region of the electrical-conducting sheet, the electrical-conducting sheets and the magnetic-conducting sheets are stacked in turn, wherein the electrical-conducting sheet can be composed of good electrical-conducting material such as gold, silver, copper and aluminum, and wherein the electrical-conducting sheets can be connected in series or in parallel; and
wherein, the second elongated through gaps do not overlap the first elongated through gaps.

6. The stator for a generator according to claim 1, wherein, the electrical-conducting layer is one of the following layers: gold layer, silver layer, copper layer and aluminum layer.

7. The stator for a generator according to claim 6, wherein the conductive wire is of flat shape or square-shape or circle-shape.

8. A generator with closed-magnetic-path, comprising the stator according to claim 1, further comprising a rotor, wherein, the conductive wire unit comprises a magnetic-conducting base plate, and
wherein the stator further comprises a magnetic yoke, the rotor comprises a transmission shaft, the conductive wire unit is fixedly connected in the magnetic yoke, at least a magnetic-conducting plate is coaxially connected on the transmission shaft, a magnet is connected on the magnetic-conducting plate, of which a magnetic pole is arranged towards the conductive wire unit.

9. A generator with closed-magnetic-path, comprising the stator according to claim 3, further comprising a rotor, wherein,
the stator further comprises a magnetic yoke, the rotor comprises a transmission shaft, the conductive wire unit is fixedly connected in the magnetic yoke, at least a magnetic-conducting plate is coaxially connected on the transmission shaft, a magnet is connected on the magnetic-conducting plate, of which a magnetic pole is arranged towards the conductive wire unit.

10. A generator with closed-magnetic-path, comprising the stator according to claim 4, further comprising a rotor, wherein,
the stator further comprises a magnetic yoke, the rotor comprises a transmission shaft, the conductive wire unit is fixedly connected in the magnetic yoke, at least a magnetic-conducting plate is coaxially connected on the transmission shaft, a magnet is connected on the magnetic-conducting plate, of which a magnetic pole is arranged towards the conductive wire unit.

11. A generator with closed-magnetic-path, comprising the stator according to claim 5, further comprising a rotor, wherein,
the stator further comprises a magnetic yoke, the rotor comprises a transmission shaft, the conductive wire unit is fixedly connected in the magnetic yoke, at least a magnetic-conducting plate is coaxially connected on the transmission shaft, a magnet is connected on the magnetic-conducting plate, of which a magnetic pole is arranged towards the conductive wire unit.

12. The generator with closed-magnetic-path according to claim 11, wherein,
a magnetic-conducting plate is connected on the transmission shaft, the magnetic-conducting plate comprises a magnetic-conducting sleeve formed by stacking multiple magnetic-conducting sheets, at least a magnet is connected on an outer surface of the bottom of the magnetic-conducting sleeve, a magnetic pole of the magnet is against the conductive wire unit, such that when the rotor is rotating, the conductive wire unit is cut by magnetic lines; a magnet is provided in the interior of the magnetic-conducting sleeve, of which a magnetic pole is against a winding of a driving motor.

13. A stator for a generator, comprising:
a coil support frame; and
a conductive wire unit arranged on the coil support frame;
wherein the conductive wire unit comprises one basic conductive wire unit or a plurality of stacked basic conductive wire units, the basic conductive wire unit comprises a conductive wire layer and a magnetic-conducting sheet conformably stacked on and insulated from the conductive wire layer;
wherein, the stator is of cylindrical shape, a cylindrical conductive wire unit is formed on the cylindrical stator, the conductive wire unit comprises a cylindrical magnetic-conducting base plate, one or more cylindrical magnetic-conducting wire units are coaxially stacked over an outer surface of the cylindrical basic conductive wire unit, the cylindrical conductive wire unit comprises a conductive wire layer formed by arranging multiple conductive wires, which have insulation layer, along the cylindrical magnetic-conducting base plate, a cylindrical magnetic-conducting sheet is conformably stacked on an outer surface of the conductive wire layer.

14. A stator for a generator, comprising:
a coil support frame; and
a conductive wire unit arranged on the coil support frame;
wherein the conductive wire unit comprises one basic conductive wire unit or a plurality of stacked basic conductive wire units, the basic conductive wire unit comprises a conductive wire layer and a magnetic-conducting sheet conformably stacked on and insulated from the conductive wire layer;
wherein, the stator is of square-shaped, a square-shaped conductive wire unit is formed on the square-shaped stator, the conductive wire unit comprises a square-shaped magnetic-conducting base plate, one or more square-shaped basic conductive wire units are conformably stacked over an outer surface of the square-shaped magnetic-conducting base plate layer by layer, wherein, the square-shaped basic conductive wire unit comprises a square-shaped solenoid and a magnetic-conducting sheet installed on an outer surface of the solenoid.

\* \* \* \* \*